United States Patent
Steelberg et al.

(10) Patent No.: US 7,313,361 B2
(45) Date of Patent: *Dec. 25, 2007

(54) DYNAMIC DATA DELIVERY APPARATUS AND METHOD FOR SAME

(75) Inventors: Ryan Steelberg, Newport Beach, CA (US); Chad Steelberg, Newport Beach, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/185,585

(22) Filed: Jul. 20, 2005

(65) Prior Publication Data

US 2005/0255852 A1     Nov. 17, 2005

Related U.S. Application Data

(63) Continuation of application No. 11/074,469, filed on Mar. 8, 2005.

(51) Int. Cl.
*H04H 7/00* (2006.01)

(52) U.S. Cl. ............... 455/3.06; 455/353; 455/420; 455/557; 709/206; 725/42; 705/14

(58) Field of Classification Search ........ 455/352–353, 455/418–420, 462, 465, 556, 557, 3.01, 3.04, 455/3.06; 709/217, 204–207, 209; 725/38–42, 725/45–47; 705/14, 37
See application file for complete search history.

(56) References Cited

U.S. PATENT DOCUMENTS

| | | | |
|---|---|---|---|
| 4,517,562 A | 5/1985 | Martinez | |
| 5,260,778 A | 11/1993 | Kauffman et al. | |
| 5,422,624 A | 6/1995 | Smith | |
| 5,504,482 A | 4/1996 | Schreder | |
| 5,515,098 A | 5/1996 | Carles | |
| 5,649,300 A | 7/1997 | Snyder et al. | |
| 5,664,948 A | 9/1997 | Dimitriadis et al. | |

(Continued)

FOREIGN PATENT DOCUMENTS

CN     1285079 A     2/2001

(Continued)

OTHER PUBLICATIONS

"Be On Eonl," Eonstreams, Inc., 2004, [online] [Retrieved on Apr. 7, 2005] Retrieved from the Internet<URL:http://www.eonstreams.com/>.

(Continued)

*Primary Examiner*—Edward F. Urban
*Assistant Examiner*—Nhan T. Le
(74) *Attorney, Agent, or Firm*—Fenwick & West LLP

(57) ABSTRACT

A system for providing enhanced radio content to a remote user is disclosed. The system includes at least one input that receives non-radio input; and, at least one output interconnected to the at least one input via a hub, wherein the at least one output receives the enhanced radio content via the hub after at least one manipulation of the non-radio input by the hub to form the enhanced radio content, wherein the at least one manipulation is in accordance with the at least one non-radio input.

45 Claims, 34 Drawing Sheets

U.S. PATENT DOCUMENTS

| | | | |
|---|---|---|---|
| 5,697,844 | A | 12/1997 | Von Kohorn |
| 5,738,583 | A | 4/1998 | Comas et al. |
| 5,806,018 | A | 9/1998 | Smith et al. |
| 5,999,808 | A | 12/1999 | LaDue |
| 6,104,815 | A | 8/2000 | Alcorn et al. |
| 6,198,906 | B1 | 3/2001 | Boetje et al. |
| 6,212,392 | B1 | 4/2001 | Fitch et al. |
| 6,298,218 | B1 | 10/2001 | Lowe et al. |
| 6,416,414 | B1 | 7/2002 | Stadelmann |
| 6,430,603 | B2 | 8/2002 | Hunter |
| 6,470,180 | B1 | 10/2002 | Kotzin et al. |
| 6,508,710 | B1 | 1/2003 | Paravia et al. |
| 6,526,275 | B1 * | 2/2003 | Calvert ............... 455/418 |
| 6,527,638 | B1 | 3/2003 | Walker et al. |
| 6,527,641 | B1 | 3/2003 | Sinclair et al. |
| 6,628,928 | B1 | 9/2003 | Crosby et al. |
| 6,628,939 | B2 | 9/2003 | Paulsen |
| 6,650,892 | B1 | 11/2003 | Thiriet |
| 6,674,995 | B1 | 1/2004 | Meyers et al. |
| 6,678,501 | B1 | 1/2004 | Valeski |
| 6,735,435 | B2 | 5/2004 | Newell et al. |
| 6,767,284 | B1 | 7/2004 | Koza |
| 6,778,820 | B2 | 8/2004 | Tendler |
| 6,895,238 | B2 | 5/2005 | Newell et al. |
| 6,957,041 | B2 | 10/2005 | Christensen et al. |
| 6,975,835 | B1 | 12/2005 | Lake et al. |
| 2001/0003099 | A1 | 6/2001 | Von Kohorn |
| 2001/0034772 | A1 | 10/2001 | Fisher et al. |
| 2001/0042019 | A1 * | 11/2001 | Omachi ............... 705/14 |
| 2001/0048748 | A1 | 12/2001 | Van Ryzin |
| 2001/0055954 | A1 | 12/2001 | Cheng |
| 2002/0038455 | A1 | 3/2002 | Srinivasan et al. |
| 2002/0049037 | A1 | 4/2002 | Christensen et al. |
| 2002/0049717 | A1 | 4/2002 | Routtenberg et al. |
| 2002/0059619 | A1 | 5/2002 | Lebar |
| 2002/0069404 | A1 | 6/2002 | Copeman et al. |
| 2002/0087532 | A1 | 7/2002 | Barritz et al. |
| 2002/0095339 | A1 * | 7/2002 | Galloway ............... 705/14 |
| 2002/0132575 | A1 | 9/2002 | Kesling et al. |
| 2002/0151272 | A1 * | 10/2002 | Simon ............... 455/3.06 |
| 2002/0168967 | A1 | 11/2002 | Clapper |
| 2003/0014483 | A1 | 1/2003 | Stevenson et al. |
| 2003/0032409 | A1 | 2/2003 | Hutcheson et al. |
| 2003/0033292 | A1 * | 2/2003 | Meisel et al. ............... 707/3 |
| 2003/0055816 | A1 * | 3/2003 | Paine et al. ............... 707/3 |
| 2003/0069032 | A1 | 4/2003 | Jarvi et al. |
| 2003/0119528 | A1 | 6/2003 | Pew et al. |
| 2003/0139190 | A1 | 7/2003 | Steelberg et al. |
| 2003/0149988 | A1 | 8/2003 | Ellis et al. |
| 2003/0182266 | A1 | 9/2003 | Stern |
| 2003/0225641 | A1 | 12/2003 | Gritzmacher et al. |
| 2004/0028388 | A1 | 2/2004 | Kataoka et al. |
| 2004/0038723 | A1 | 2/2004 | Schneier et al. |
| 2004/0064524 | A1 | 4/2004 | Van Steenbergen et al. |
| 2004/0093394 | A1 * | 5/2004 | Weber et al. ............... 709/219 |
| 2004/0117831 | A1 | 6/2004 | Ellis et al. |
| 2004/0127199 | A1 | 7/2004 | Kagan et al. |
| 2004/0177383 | A1 | 9/2004 | Martinollch et al. |
| 2004/0194131 | A1 | 9/2004 | Ellis et al. |
| 2005/0021521 | A1 * | 1/2005 | Wycoff ............... 707/10 |
| 2005/0090279 | A9 | 4/2005 | Witkowski et al. |
| 2005/0137958 | A1 * | 6/2005 | Huber et al. ............... 705/37 |
| 2005/0188402 | A1 | 8/2005 | de Andrade et al. |
| 2005/0198317 | A1 | 9/2005 | Byers |
| 2005/0239402 | A1 | 10/2005 | Gioscia et al. |
| 2005/0267817 | A1 | 12/2005 | Barton et al. |
| 2005/0289630 | A1 | 12/2005 | Andrews et al. |

FOREIGN PATENT DOCUMENTS

| | | |
|---|---|---|
| JP | 03-184486 | 8/1991 |
| JP | 05-284162 | 10/1993 |
| JP | 07-505028 | 6/1995 |
| JP | 09-018430 | 1/1997 |
| JP | 2000-244427 | 9/2000 |
| WO | WO 99/49663 | 9/1999 |
| WO | WO 02/01869 A1 | 1/2002 |

OTHER PUBLICATIONS

"Case Studies | Demonstrations: Case Studies . . . " Eonstreams, Inc., 2004, [online] [Retrieved on Apr. 7, 2005] Retrieved from the Internet<URL:http://www.eonstreams.com/SamplesCase.htm>.

"Case Studies | Demonstrations: What We Do . . . " Eonstreams, Inc., 2004, [online] [Retrieved on Apr. 7, 2005] Retrieved from the Internet<URL:http://www.eonstreams.com/Samples.htm>.

"Case Studies | Demonstrations: WIVK Knoxville, TN . . . " Eonstreams, Inc., 2004, [online] [Retrieved on Apr. 7, 2005] Retrieved from the Internet<URL:http://www.eonstreams.com/SamplesDemosWIVK.htm>.

"Case Studies | Demonstrations: Z100, NY . . . " Eonstreams, Inc., 2004, [online] [Retrieved on Apr. 7, 2005] Retrieved from the Internet<URL:http://www.eonstreams.com/SamplesDemosZ100.htm>.

"CEO | CTO | CFO: Kevin Woods, CTO" Eonstreams, Inc., 2004, [online] [Retrieved on Apr. 7, 2005] Retrieved from the Internet<URL:http://www.eonstreams.com/CoInfoCTO.htm>.

"CEO | CTO | CFO: Steve Newman, CEO" Eonstreams, Inc., 2004, [online] [Retrieved on Apr. 7, 2005] Retrieved from the Internet<URL:http://www.eonstreams.com/CoInfoCEO.htm>.

"CEO | CTO | CFO: Susan Seagraves, CFO" Eonstreams, Inc., 2004, [online] [Retrieved on Apr. 7, 2005] Retrieved from the Internet<URL:http://www.eonstreams.com/CoInfoCFO.htm>.

Jones, J.L. et al., "Combinatorial Auctions Using Rule-Based Bids," Decision Support Systems, 2002, pp. 59-74, vol. 34.

"Subscription | Pay-Per-View | Advertising | Streaming: Advertising . . . " Eonstreams, Inc., 2004, [online] [Retrieved on Apr. 7, 2005] Retrieved from the Internet<URL:http://www.eonstreams.com/ServicesAdv.htm>.

"Subscription | Pay-Per-View | Advertising | Streaming: Pay-Per-View . . . " Eonstreams, Inc., 2004, [online] [Retrieved on Apr. 7, 2005] Retrieved from the Internet<URL:http://www.eonstreams.com/ServicesPPV.htm>.

"Subscription | Pay-Per-View | Advertising | Streaming: Streaming . . . " Eonstreams, Inc., 2004, [online] [Retrieved on Apr. 7, 2005] Retrieved from the Internet<URL:http://www.eonstreams.com/ServicesStreaming.htm>.

"Subscription | Pay-Per-View | Advertising | Streaming: Subscription . . . " Eonstreams, Inc., 2004, [online] [Retrieved on Apr. 7, 2005] Retrieved from the Internet<URL:http://www.eonstreams.com/ServicesSub.htm>.

"Subscription | Pay-Per-View | Advertising | Streaming: Total Solutions . . . " Eonstreams, Inc., 2004, [online] [Retrieved on Apr. 7, 2005] Retrieved from the Internet<URL:http://www.eonstreams.com/Services.htm>.

"WSM | Citadel Broadcasting Corporation," Eonstreams, Inc., 2004 [online] [Retrieved on Apr. 7, 2005] Retrieved from the Internet:<URL:http://www.eonstreams.com/TestimonialsCitadel.htm>.

"WSM | Citadel Broadcasting Corporation: Clients Love Us . . . " Eonstreams, Inc., 2004, [online] [Retrieved on Apr. 7, 2005] Retrieved from the Internet:<URL:http://www.eonstreams.com/Testimonials.htm>.

"WSM | Citadel Broadcasting Corporation: 650 WSM," Eonstreams, Inc., 2004, [online] [Retrieved on Apr. 7, 2005] Retrieved from the Internet:<URL:http://www.eonstreams.com/TestimonialsWSM.htm>.

"By Using Multicast, Wireless Communication, New Information Can Be Distributed," Nikkei Internet Technology, Sep. 22, 1997, pp. 106-111, vol. 3.

"Eonstreams, Inc. Secures Financing to Deploy Revolutionary Ad Insertion Capability," Source Eonstreams, Inc., Mar. 29, 2005, 2 Pages, [online] [retrieved on Apr. 8, 2005] Retrieved from the Internet: <URL: http://www.pmewswire.com/cgi-bin/stories.pl?ACCT=104&STORY=/www/story/03-29-2005/0003288...>.

"Eonstreams, Advertise with us!," Eonstreams, Inc., 2006, 1 page, [online] [retrieved on Apr. 28, 2006] Retrieved from the Internet: <URL: http://www.eonstreams.com/Advertisers.htm>.

"Eonstreams, Better together . . . ," Eonstreams, Inc., 2006, 1 page, [online] [retrieved on May 22, 2006] Retrieved from the Internet: <URL: http://www.eonstreams.com/>.

"Eonstreams, FAQs," Eonstreams, Inc., Mar. 3, 2006, 7 pages, [online] [retrieved on Apr. 28, 2006] Retrieved from the Internet: <URL: http://www.eonstreams.com/HowToFaqs.htm>.

"Eonstreams, Press releases . . . ," Eonstreams, Inc., Feb. 2, 2006, 6 pages, [online] [retrieved on Apr. 28, 2006] Retrieved from the Internet: <URL: http://www.eonstreams.com/PressReleases.htm>.

"Eonstreams, Streaming . . . ," Eonstreams, Inc., 2006, 1 page, [online] [retrieved on Apr. 28, 2006] Retrieved from the Internet: <URL: http://www.eonstreams.com/Streaming.htm>.

"Eonstreams, Tools . . . ," Eonstreams, Inc., 2006, 1 page, [online] [retrieved on Apr. 28, 2006] Retrieved from the Internet: <URL: http://www.eonstreams.com/How_To_Tools.htm>.

"Eonstreams, Who we are . . . ," Eonstreams, Inc., 2006, 1 page, [online] [retrieved on Apr. 28, 2006] Retrieved from the Internet: <URL: http://www.eonstreams.com/About_Us.htm>.

"MediaSpan Online Services Partners With Eonstreams," EContentMag.com, Feb. 3,2006, 3 pages, [online] [retrieved on Apr. 28, 2006] Retrieved from the Internet: <URL: http://www.econtentmag.com/Articles/ArticleReader.aspx?ArticleID=15031>.

"NAB2005—The World's Largest Electronic Media Show," National Association of Broadcasters, 2005, 2 pages, [online] [retrieved on Apr. 28, 2006] Retrieved from the Internet: <URL: http://www.nabshow.com/exhibitors/NAB2005/company.asp?id=11150>.

"Streaming Audio and Video Development and Media Hosting Solutions," VitalStream, Inc., 2000-2006, 1 page, [online] [retrieved on May 22, 2006] Retrieved from the Internet: <URL: http://www.vitalstream.com/about/index.html>.

"VitalStream Acquires Eonstreams to Provide Comprehensive Online Advertising Solutions," VitalStream, Press Release, May 22, 2006, 3 pages, [online] [retrieved on May 22, 2006] Retrieved from the Internet: <URL: www.vitalstream.com/news/release-05-22-06.html>.

PCT International Search Report, PCT/US02/04769, Jul. 23, 2002, 2 pages.

PCT International Search Report, PCT/US02/19983, Oct. 18, 2002, 1 page.

PCT International Search Report and Written Opinion, PCT/US06/09350, Jan. 11, 2007, 7 pages.

\* cited by examiner

Receive Information — Manipulate Information — Output Information

Station - General Information

Station Fees

Set the default fees associated with this station

| Fee Type | |
|---|---|
| Open Inventory - Off hours | 0.00 |
| Open Inventory - Prime Time | 0.00 |
| Non-Exclusive Song | 0.00 |
| Exclusive Song | 0.00 |
| Non-Exclusive Artist | 0.00 |
| Exclusive Artist | 0.00 |
| Non-Exclusive Commercial | 0.00 |
| Exclusive Commercial | 0.00 |

Update

Next

DYNAMIC DATA DELIVERY APPARATUS AND METHOD FOR SAME

CROSS-REFERENCE TO RELATED APPLICATIONS

This application is a continuation of U.S. patent application Ser. No. 11/074,469, filed on Mar. 8, 2005.

FIELD OF THE INVENTION

The present invention relates generally to the delivery of information and data, and more particularly, to a dynamic data delivery apparatus and a method for dynamic data delivery.

BACKGROUND OF THE INVENTION

As may be realized by those possessing an ordinary skill in the pertinent arts, there is a desire to deliver information to segmented portions of the population, such as for advertising. For example, if a company has developed a new product it may be beneficial to deliver news about the existence of the product to individuals who may need or want to use such a product. Throughout history, mechanisms have been developed to transmit such information to the desired segment of the population, such as consumers. For example, print media provides a large scale delivery mechanism, radio provides a geographically localized medium, television provides an audio and visual medium with a possibly global reach, and the internet provides a mechanism with global reach. Of these mechanisms, radio may provide the best delivery mechanism to population segments who may be otherwise distracted, such as by providing an opportunity to reach a consumer when the consumer is driving a car and sitting in traffic on a freeway, such as while commuting to or from work.

Generally, mass media may thus be categorized based upon, for example, coverage, content, presence, maintenance, adaptability prominence, viewer control, and cost. Each of these categories may be weighted in determining the best way to advertise or transmit particular information to the proper population segment, and each category may be manipulated once a delivery mechanism is selected. In accordance with this weighting and subsequent manipulation, coverage defines the area the medium reaches, content refers to the amount and nature of the information conveyed, presence refers to the accessibility of the information, maintenance refers to an assessment of keeping the message available over time, adaptability refers to the quality based on how easy changes to the information may occur, prominence refers to how successfully the information may be delivered or displayed to particular segments, viewer or listener control refers to an assessment of content and timing of information transmission, and cost is the price associated with production and transmission of the information.

When seeking to distribute information to consumers, distribution methodologies are obviously limited to those that are technologically feasible. As such, the introduction of new methodologies of delivering information, generally, are welcomed additions and are utilized to provide information to consumers. However, the development of new methodologies has historically necessitated that entire delivery systems be overhauled to accommodate the new delivery mechanisms.

As is known to those possessing an ordinary skill in the pertinent arts, the FM broadcast band consists of that portion of the radio frequency spectrum between 88 MHz and 108 MHz. It is divided into 100 channels of 200 kHz each. The television broadcast band consists of that portion of the radio frequency spectrum between 54 MHz and 806 MHz. The television broadcast is typically divided into 68 channels of 6 MHz each, with some gaps existing between channels. The AM broadcast band consists of that portion of the radio frequency spectrum between 535 to 1705 kHz. The AM broadcast band consists of 117 carrier frequencies assigned in 10 kHz steps. While these broadcast regions are representative samples, there are other regions of the radio frequency spectrum designated for other spectral transmissions, such as cell phones, cordless phones, Short Message Service (SMS), satellite, and baby monitors, for example.

In addition, many population segments are spending a greater amount of time outside of the home, such as in vehicles commuting to work. As urban sprawl causes population expansions and individuals move farther from the place of work or school, individuals spend more time commuting. As such, the increased time away from home, and particularly in a vehicle, provides an increased opportunity to deliver information to desired population segments. Many states are looking or beginning to ban the use of cell phones while driving, which may further limit the resources one may use while in a vehicle and thereby provide increased delivery opportunities for non-banned delivery methods.

A need therefore exists for an apparatus, system, and method whereby information may be delivered and/or displayed from one or more of a plurality of sources to a user/consumer, to thereby achieve greater connectivity to resources and information, and to thereby provide improved marketing and increased connectivity.

SUMMARY OF THE INVENTION

A system for providing enhanced radio content to a remote user is disclosed. The system includes at least one input that receives non-radio input; and, at least one output interconnected to the at least one input via a hub, wherein the at least one output receives the enhanced radio content via the hub after at least one manipulation of the non-radio input by the hub to form the enhanced radio content, wherein the at least one manipulation is in accordance with the at least one non-radio input.

Further, a system for providing at least one greeting with a broadcast utilizing a radio display is disclosed. The system includes an input data feed; a generated signal suitable for incorporation with the input data feed to form an incorporated signal, the generated signal including the at least one greeting formatted by a hub into a format compatible with the input data feed, and the generated signal including a directionality for directing the incorporated signal to at least one selected receiver that utilizes a radio display capable of displaying the at least one greeting in a format of the incorporated signal; and, directionally outputting at least the generated signal to the at least one selected receiver.

BRIEF DESCRIPTION OF FIGURES

Understanding of the present invention may be facilitated by consideration of the following detailed description of the preferred embodiments of the present invention taken in conjunction with the accompanying drawings, in which like numerals refer to like parts, and:

FIG. 3 illustrates a representation of an embodiment of the system of FIGS. 1 and 2;

FIG. 6 illustrates a screen shot of the general information screen used for the creation of a campaign;

FIG. 10 illustrates a general information window, which provides places for entry of information regarding the data of the device to be entered;

FIG. 17 illustrates a fees sheet associated with the station of FIG. 16;

FIG. 19 illustrates a screen shot of the screen used to provide fillable filed associated with the content general information;

FIG. 23 illustrates a screen shot of a window reached from the window of FIG. 21B;

DETAILED DESCRIPTION OF THE PREFERRED EMBODIMENTS

Figure 1:
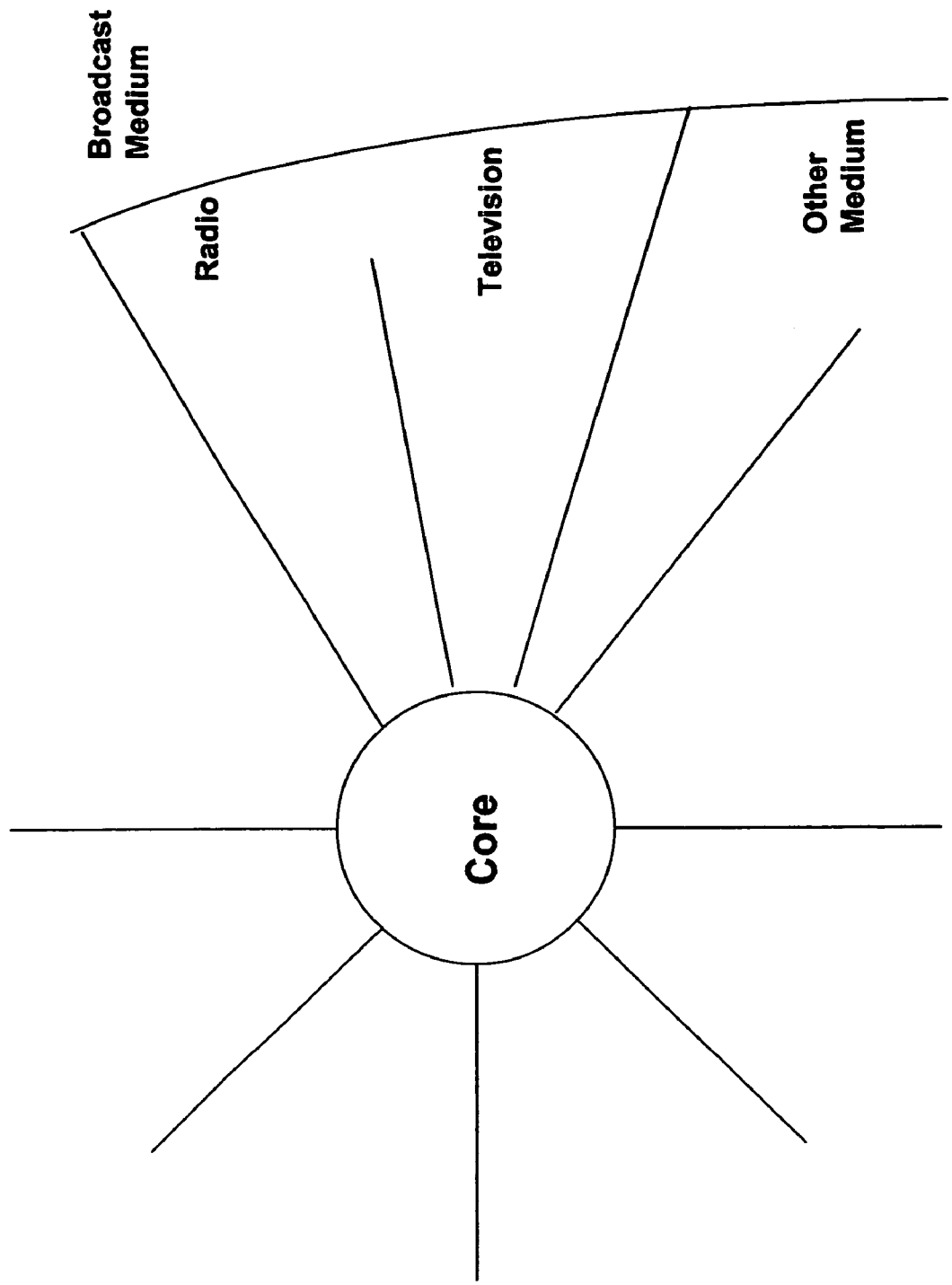
FIG. 1 illustrates a pictorial representation of the present invention.

It is to be understood that the figures and descriptions of the present invention have been simplified to illustrate elements that are relevant for a clear understanding of the present invention, while eliminating, for the purpose of clarity, many other elements found in typical data delivery components and methods of performing the same. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

According to an aspect of the present invention spots, such as audio spots, text and data campaigns, may be dynamically targeted, delivered and reported from a centralized hub network. As may be evident to those possessing an ordinary skill in the pertinent arts, a centralized hub architecture is described herein, while other architecture known to those possessing and ordinary skill in the art may also be used.

The present invention may enable small and mid-sized radio groups to aggregate advertising inventory with other stations to create a national advertising network. This technology may enable an intelligent cost effective national ad network. Entities who join a network may be able to capture a greater portion of the national radio advertising market that currently is not captured at all or by the entity. Incremental revenue gain, by capturing national ad buys more efficiently, may permit radio stations to offer additional barter inventory to a company. According to an aspect of the present invention, and based on the installed base, the option may exist to provide national advertisers with access to 3,500 stations to run national radio advertising campaigns.

The technology of the present invention may offer enhanced Radio Automation Software solutions which may enable advertisers and broadcasters greater flexibility and control. The present invention may offer a variety of improved features and functionality that may enable a company to capture share of the national and regional advertising spend.

Such features and functionality may include the ability to launch new products such as real time reporting of ad campaigns and play lists and targeted advertising opportunities. Enhanced reporting may also be realized, improving the current best case of weekly reporting to real time reporting. Such improvements may allow for better management of stations and more effective advertising. In addition, advertisers may have ad run verification and reporting never before available.

Another feature may include the real time which may enable advertisers to switch out an ad spot in real time thereby optimizing the return on ad dollars spent.

Further functionality may include the use of conditional ad spots which may be tied to external factors affecting product promotion, such as weather for consumer beverages, concert promotions tied to song play lists, and competitive responses to ad campaigns run by a rival.

Further, according to an aspect of the present invention data services via terrestrial broadcasting may be provided, such as a text messaging product, RadioGreetings.com, traffic and weather updates, new headline and stock market live updates.

According to an aspect of the present invention, improved functionality may provide targeted advertising opportunities, such as geographic, time of day and event driven advertising. By way of non-limiting example only, a call center trigger may tie to an advertiser's call center and may be set to not run a direct response spot if the advertiser's call center is over an agreed upon utilization rate.

In one aspect, the present invention may be utilized to provide outsource data workflow management and wireless data delivery solutions for radio and television broadcasters, content and data service providers, and hardware and device manufacturers, as well as to groups similarly situated.

In another aspect, the present invention may be utilized to enable broadcasters and marketers to target and deliver audio and/or text-based programming to devices that support or receive such information, such as Radio Data System (RDS)-enabled car receivers, and utilize data broadcasting, such as DAB or HD Radio.

In another aspect, the present invention may provide audio and/or text programming including, but not limited to, song and artist information, news, weather, traffic, station content, AMBER Alerts, and advertisements, such that the text programming may be broadcast and displayed on a receiver, such as an RDS-enabled receiver.

In an exemplary embodiment of text delivery according to an aspect of the present invention, greetings may be delivered, for example, to one or more radios. Such a delivery may enable consumers to create and broadcast a completely custom text message, at a specified time interval, which message may be managed through a completely automated and user-friendly interface.

The deliveries of the present invention may include providing a visual component to radio. This visual component may enable broadcasters, such as terrestrial FM broadcasters, and subsequently content and service providers, to dynamically schedule, target, broadcast, and report on text programming and advertising. Such scheduling, targeting, broadcasting, and reporting may preferably utilize the required protocols to deliver such programming and advertising, such as utilizing the Radio Data System (RDS) protocol, and the delivery may occur via at least one broadcasting station or via multiple stations, either synchronously or asynchronously. The present invention may thus provide a new consumer distribution vehicle for content and data service providers.

The present invention, via the provision of the new distribution vehicle, may provide essential content and data management, and business support services such as data format integration, data transformation, campaign scheduling, data (text) delivery, audio delivery and real-time reporting and analysis. The present invention may thereby enable content and data service providers to plan, target, and deliver data and content files seamlessly across coverage areas reaching, for example, more than 15,000,000 people. The present invention may offer direct access to such a coverage area network, such as through a multi-station network that provides wide reach, signal redundancy and pinpoint targeting. The present invention may thus seamlessly support a myriad of delivery methods, including radio delivery methods such as DAB (HD Radio) data broadcasting for both FM and AM stations. While the present description sets forth the delivery of text or data messages specifically, the present invention is also directed toward providing audio messages as well. In this regard, reference to a text or data message may include therein a reference to audio messages.

Through the use of the present invention, a portion of the population, such as marketers and advertisers, may be provided with the ability to communicate with the consumer public directly, such as through the text display of radio receivers. For example, advertisers may leverage the strength of top FM radio stations to capture an audience, thereby transmitting the message of the advertiser, such as through a text-based radio vehicle. Advertisers may promote a company, or one or more products or services, to a large pool of targeted, format specific consumers. An advertiser may, for example, create a text message campaign that may be broadcast and displayed on selected devices.

The present invention may, to enable such a message campaign, more specifically provide packet-based, centralized Radio Data Service (RDS) management and data broadcasting. The present system may enable broadcasters, such as FM radio broadcasters, and marketers to dynamically schedule, target, deliver, and report on RDS data broadcasts across one or multiple mechanisms, such as radio stations, all through a user-friendly desktop software. The present invention may allow broadcasters and marketers to target and deliver subcarrier content to RDS-enabled car receivers. Information that may be provided by the RDS methodology includes, by way of non-limiting example: playlist information, such as song title, artist, album, label; advertisements; weather; traffic; news; stocks; sport scores; station content; concert information; and, custom content, such as personalized greetings.

The present invention incorporates a user-friendly, desktop software, herein referred to as software or integrator, that may enable the integration of content provision, forecasting and management of available text inventory, schedules, campaigns, target devices and target groups, delivery of broadcasts, including text broadcasts, and efficient handling of reporting and billing, all from a personal computer.

As discussed hereinthroughout, single broadcast points, such as broadcast stations or networks, may be employed to target the proper or desired group or individual, and such delivery may be manipulated within the integrator. Further, scheduling may be utilized to increase the amount of data likely to reach the proper or desired destination. Tracking may be employed to determine that a text message was delivered, and further may be used to determine if desired results are being achieved. These records may be auditable, and may be monitored in real-time, and be monitored by a time-stamp, such as in minutes. A user may, via the integrator, know what is scheduled to be delivered, what is available, and what is in the process of being delivered. This may permit users to plan and manage to achieve maximum effectiveness and highest value, such as by targeting by station, time, playlists, songs, audio spots, and a host of other targeting variables. When running campaigns, users may utilize insights gained from timely reports to, for example, adjust schedules, target criteria, rotate ads or swap in a different ad in a small time window, such as in less than a few minutes, to thereby ensure that each campaign is tuned for maximum effectiveness. This may further enhance services by supporting multiple clients on a single subcarrier band, and by providing campaign scheduling, data type support, such as text, images, software, raw data, Meta data, and audio, for example, and by providing delivery, tracking and reporting.

The present invention may also enable individual stations and broadcast networks to manage subcarrier bands, such as by providing data and content collection, campaign scheduling, targeting and reporting functions management, and by providing data delivery management software and servers, which may, in one embodiment, be located at each broadcast station. With a distributed system architecture leveraging multiple subcarrier bands, the present invention may offer scalability, reliability and the power needed to deliver any volume of data campaigns and services to any reachable user group.

Referring now to FIG. 1, there is shown a pictorial representation of the system according to an aspect of the present invention. As may be seen in FIG. 1, there is a relatively centrally located hub that is capable of accepting inputs from a myriad of sources, and outputting information to a myriad of sources. The information may be output to the same sources that provided input information, or may output to a new set of outputs, or to some combination thereof. As may be seen, the outputs may include broadcast media, such as radio, television, satellite, satellite via proxy over internet protocol, and cell phone, by way of non-limiting example only. Inputs may include news, sport, personal information, and play lists, for example, and inputs may come from a myriad of sources, such as telephonically or via computer. Further, inputs may include a feed from one of the outputs, such as in a feed back loop that may, in turn, effect the output that provided the initial input. For example, the input may include a radio station input such that the hub may provide information related to this input feed, such as artist information and song information playing on a radio station input, for example. The hub may be configured to manipulate at least one input or a series of inputs, which inputs may be received simultaneously or over time, and the hub may parse the necessary information, while outputting at least one output based on the input information, and each action may occur in accordance with an initial user instruction.

Figure 2:
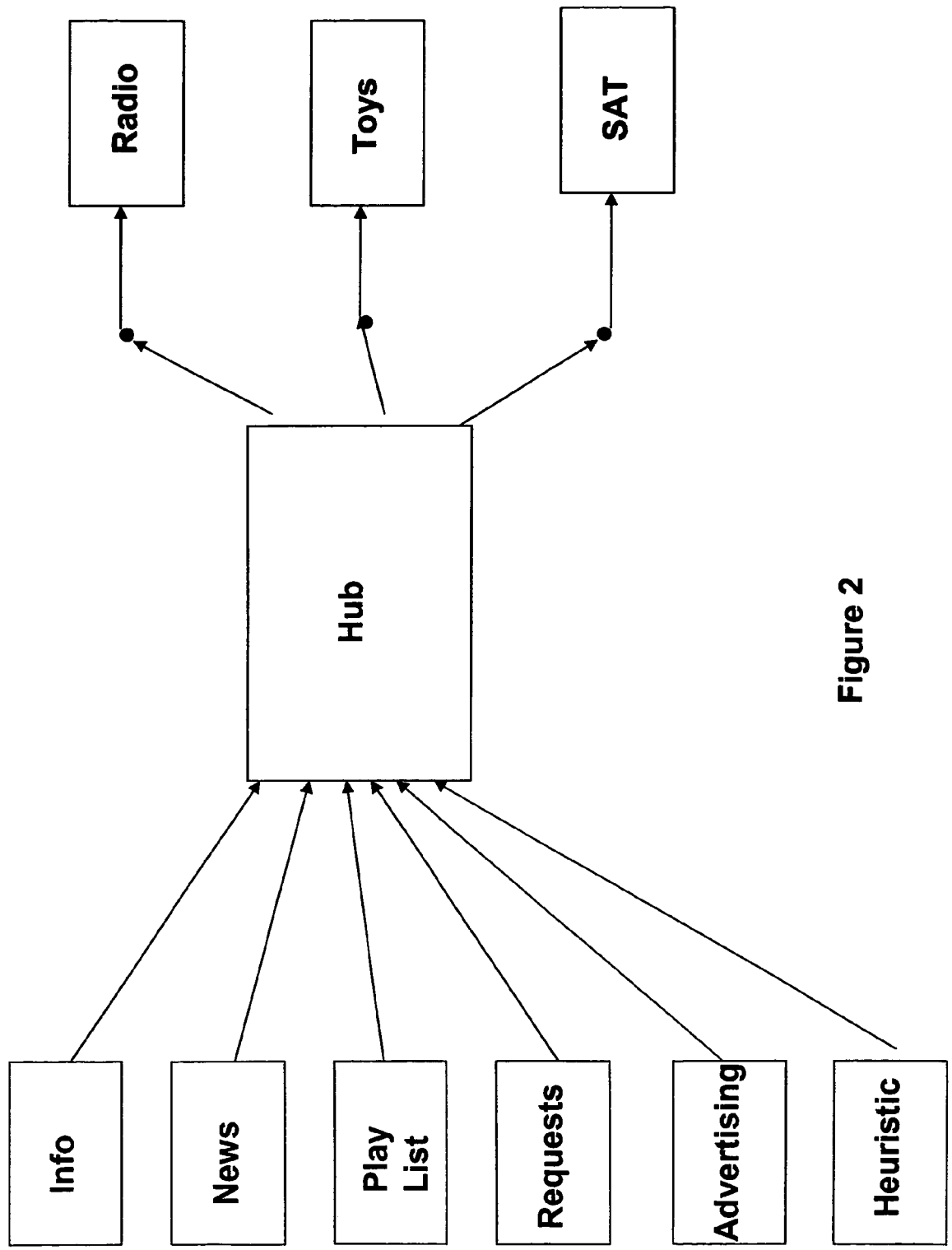
FIG. 2 illustrates a pictorial representation of the present invention.

Referring now to FIG. 2, there is shown a pictorial representation of elements according to an aspect of the present invention. Specifically, there is shown a hub with inputs and outputs. Such inputs may include information to be delivered, news, current events, play lists, requests, such as search requests, advertising, and heuristic, or feedback, information. Such outputs may include communicatively coupled connections to devices, such as toys, radios, satellite communications, web browsers, and cell phones, using wired or wireless standards known to those possessing an ordinary skill in the pertinent art.

The communication required from the hub may be determined based on the type of device receiving the communication, or by the instructions input to the hub via the inputs. For example, the outbound communication may take the form of a CDMA broadcast with header. When the broadcast reaches the desired devices, the devices receive it and take action based on the broadcast based, in part, upon the header. Thus, the hub, upon sending the communication via the output, is aware of the necessary header information required to cause the receiving device to engage in the desired action. Further, the hub may be informed via the input that any device not responding may be queried again by the output a second or a pre-determined number of times, or may be continually queried until an acknowledgement response is received as an input. Thus, the hub may provide a feedback loop from outputs to inputs. Further, as illustrated in this example, the hub includes a flexible superset of logic that anticipates responses, and that itself responds based upon both the received response and the anticipated responses to output from the hub.

Input via the inputs may include instructions and requests. Input may come from a source, which source may be, for example, a network node feed, such as a network interface. Inputs may be user-operated, or automated, or blended. For example, a user may enter a criteria to be searched for into the input, and the input may automatically search, such as via a predetermined internet search engine interface, for the input search criteria at an input interval for searching.

Transmission via the outputs may occur on a primary carrier to the targeted devices or devices, or on the sub carriers to the targeted device, as necessary and as known to those possessing an ordinary skill in the pertinent arts. When utilizing both the primary and sub carrier bands, the same information may be placed on each to provide for redundancy and robustness of the probability of receipt by the targeted device or devices, or alternatively different information may be overlayed on each of the primary and sub carrier bands.

The hub may include a series of layers, which layers may include an integrator as discussed hereinabove, and, within or in association with the integrator, a business layer, and, within or associated with the business layer, a transport layer. The integrator preferably integrates all functionality as input at the inputs, such as by a user, with the action desired to be taken, and with the outputs.

The business layer preferably processes data, such as data requested from the inputs by the integrator. The business layer may consist of one or more scripts, which may be accessible from the hub, or which may be entered via one or more of the inputs to the hub, which scripts may operate on one or more incoming data items to manipulate those one or more data items for handoff to one or more data transport mechanisms within the transport layer for output from one or more outputs. Thus, the business layer may algorithmically process a single or multiple output requests from at least one input into multiple deliverable data sets, deliverable via one or multiple end points having one or multiple protocols. Once the business layer has completed processing the data, information incorporating both the data and the processed information may be provided to the selected transport mechanism of the transport layer, such as XML, for example. The desired information, such as the desired message, may then be delivered to an output, such as a radio station, and may be delivered, such as via the station, to the targeted party. Further, for example, the output frequency for the particular output from the transport layer may be selected in accordance with the application of the logic in the business layer in accordance with the instructions from the input.

Thus, in an exemplary embodiment related to FIG. 2, a station may be a broadcast point, and hence may be available from within the transport layer. A station may thus be a gateway to a broadcast, and a gateway may be included, as an output within the transport layer, in the definition of the station. A station definition may include one or more numerous delivery mechanisms via the gateway, such as, FM, AM, internet, SMS and satellite, for example. Each of these mechanisms may have specific delivery requirements, as is known to those possessing an ordinary skill in the pertinent arts, which requirements are known by the hub. For example, when utilizing delivery via the internet, internet protocols must be followed and the message may be proxied.

Further, an internet transmission may be specified in analog and high definition, such as by specifying the domain. The information may be transmitted simultaneously over more than one gateway, as a redundant delivery mechanism ensures an increased success rate of delivery as is known to those possessing an ordinary skill in the pertinent arts. While gateways may be internet based, gateways need not be. Gateways may also be private or public, and thus may be associated in the hub with a variety of security levels. Data may be delivered via the gateway based on all specified criteria, wherein recipient is a proxy for the criteria.

For example, if a radio based transmission is selected, it may be necessary within the hub to account for different degrees of coverage of the transmitted signal. Additionally, because the delivery mechanism instructed for use is a radio transmission, the delivered data may be shipped on a subcarrier channel if selected or desired. This may, for example, be performed by setting the data for a 1 Kb/s transmission rate through the output, and encoding the signal on the channel signal offset 57 kHz from the center frequency of the radio station band targeted for broadcast. The data may be modulated 57 kHz off center of the FM broadcast channel from the gateway, for example.

This exemplary transmission mechanism through the transport layer from a gateway via the output, while employable in the United States, may not be as simplistically employable in other countries. For example, the output wattage of radio stations in Europe is known to be significantly smaller. Therefore, it may be necessary to echo the transmission via multiple broadcast points to ensure successful transmission and receipt, and such a necessity is anticipated by the hub, such as by monitoring a target location or time for the outbound communication. This echoing may also be performed in the united States to ensure more frequent successful delivery, and hence may be varied by the hub in accordance with a target success probability. In order to account for such a limitation, a repeater may be necessary within the transport layer, as may be multiple simulcast points. In such an embodiment, the repeater may preferably be TCP/IP enabled, to thereby more simplistically communicate with the hub and the target device.

For example, in a multiple simulcast environment, frequent channel changing may be needed as a recipient moves through multiple environments. As is known to those possessing an ordinary skill in the pertinent arts, radiocarriers frequently ship daughter bands on sub-channels of the main band. When transmitting data according to an aspect of the present invention, it may be desirable to repeatedly determine if the daughter band signal is stronger as the desired recipient moves through numerous environments. If the daughter band is stronger, the data may be delivered on the daughter band instead of the conventional main band signal. Further, as the recipient moves, the broadcast from the transport layer of the hub may be available only on different ones of the multi-simulcast stations, and no longer available on the main band or its daughter bands. In such embodiments, for example, and RDS radio may receive from the hub an 8 character RDS display displaying text in accordance with station being received, rather than of the frequency of the station being received. In such an embodiment, all main bands and daughter bands corresponding to each of the multi-simulcast stations may cause to be displayed the same 8 character message. In such an embodiment, the radio may thereby track, such as on a subcarrier channel, the frequencies to which the RDS radio must be switched in order to maintain receipt of the broadcast desired, by tracking the message being broadcast for tracking, and, as the same 8 character text would be displayed even in the event that the radio switched to a daughter band or another of the multi-simulcast bands, the radio listener would not be disturbed by display of ever changing frequencies. Thus, the 8 character text data may be transmitted simultaneously on all transmissions by the same multi-simulcast, and thereby the need for undesirable channel-changing, or ever-changing display of automatically changing channels, to maintain data receipt would be eliminated.

Thus, in the exemplary embodiment of an RDS radio, the present invention may make particular use of sub-channels or multi-simulcast points. For example, each main band may have a data group that may be received by an RDS radio associated with each of its sub-bands, which sub-bands for AM and FM radio are discussed hereinabove. Sub-band 15, for example, for any given station may provide data of 64 bytes scrolling text across a receiving RDS radio. Thus, a desired message may be entered via an input to the hub, sent via an output for broadcast, be broadcast for receipt on sub-band 15 of a particular station as scrolling text, and all RDS-enabled listeners of sub-band 15 on that station may thereby receive the desired scrolling message across the RDS radio.

Alternatively, due to unique identifiability of RDS radios, such as via identification chips resident within each radio, only particular vehicles may be targeted with the input message by the output, in an embodiment wherein the hub has access to translate a target input to the hub to a particular radio identification. For example, if the data group of sub-band 8 is unused in a typical RDS embodiment, the target identification may be broadcast on sub-band 8, and the desired message for that target may be broadcast on sub-band 15. Consequently, upon receipt of the message on sub-band 8 by the identified radio, that radio may be instructed by the sub-band 8 message to display the message being received on sub-band 15. As may be apparent to those skilled in the art, such an exemplary embodiment may be employed with respect to any recipients using any device capable of receiving signals on multiple frequencies. That is, recipients using any such devices may receive uniquely directed messages to monitor a particular other message outgoing from the hub, and all recipients not so-instructed by the uniquely directed message may ignore both messages. In such an embodiment, a user may enter, via one of the inputs, to the hub a desired message, a time or times for repeated broadcast, an output methodology, and/or a specific recipient. The hub, such as within the business layer, then makes the decision of how to format the broadcast, such as targeting the specified user on sub-band 8 and broadcasting the message on sub-band 15 of the entered radio station in the entered geographic area in the above example, and sends the necessary information outbound through the outputs via the transport layer.

Thereby, the hub defines the workflow of the system. Multiple embodiments of the presentation of the hub are possible and need not be described in detail herein. The present invention may include, within the hub, the integrator in the form of, for example, a management software integrated as part of the hub, which management software may be based on a user-friendly, desktop program that enables the easy scheduling and managing of text campaigns, creation of compelling text programming, managing of available inventory, and efficient handling of reporting and billing. Such a management scheme may be resident on a personal computer or a handheld device, or may be remotely available via connection to a network, such as by wired or wireless methodologies.

As may be realized by those possessing an ordinary skill in the pertinent arts, a request received at an input, such as from a browser or other input device, may activate the hub. Once the hub is activated, numerous task must be performed in a tightly time constrained period, such as 60 ms in an embodiment wherein an ad is to be selected an inserted on a web page being output from the hub for broadcast from the outputs to a targeted party, for example. This speed necessity, and requirement for multiple layers of backup computing, may require numerous servers to be resident to perform the necessary computing of the hub.

Referring now to FIG. 3, there is shown a representation of an embodiment of the system of FIGS. 1 and 2. This embodiment sets forth the steps that the hub may perform in controlling the system according to an aspect of the present invention. As may be seen in FIG. 3, the hub may receive information from at least one of the myriad of inputs. The hub may manipulate or process this received information in one or more of the layers of the hub. The hub may then output the processed information to at least one of the myriad of outputs. Further, the logic resident within the layers of the hub may decide, based on the input message and desired delivery mechanisms, the message and transmission formatting, repetition, and timing, for example. The manipulation or processing performed by the hub is further described hereinbelow.

With respect to the discussion of the figures hereinthoughout, it may be understood by those skilled in the pertinent art that the numerous selection mechanisms illustrated and screen designs employed are exemplary only, and hence may be interchangeable. For example, the terms select, click, double click, and the like are interchangeable terms relating to methods of user selections. Further, the terms button, tab, menu, tree, and the like are interchangeable terms relating to methods of displaying information for selection by the user.

Figure 4:
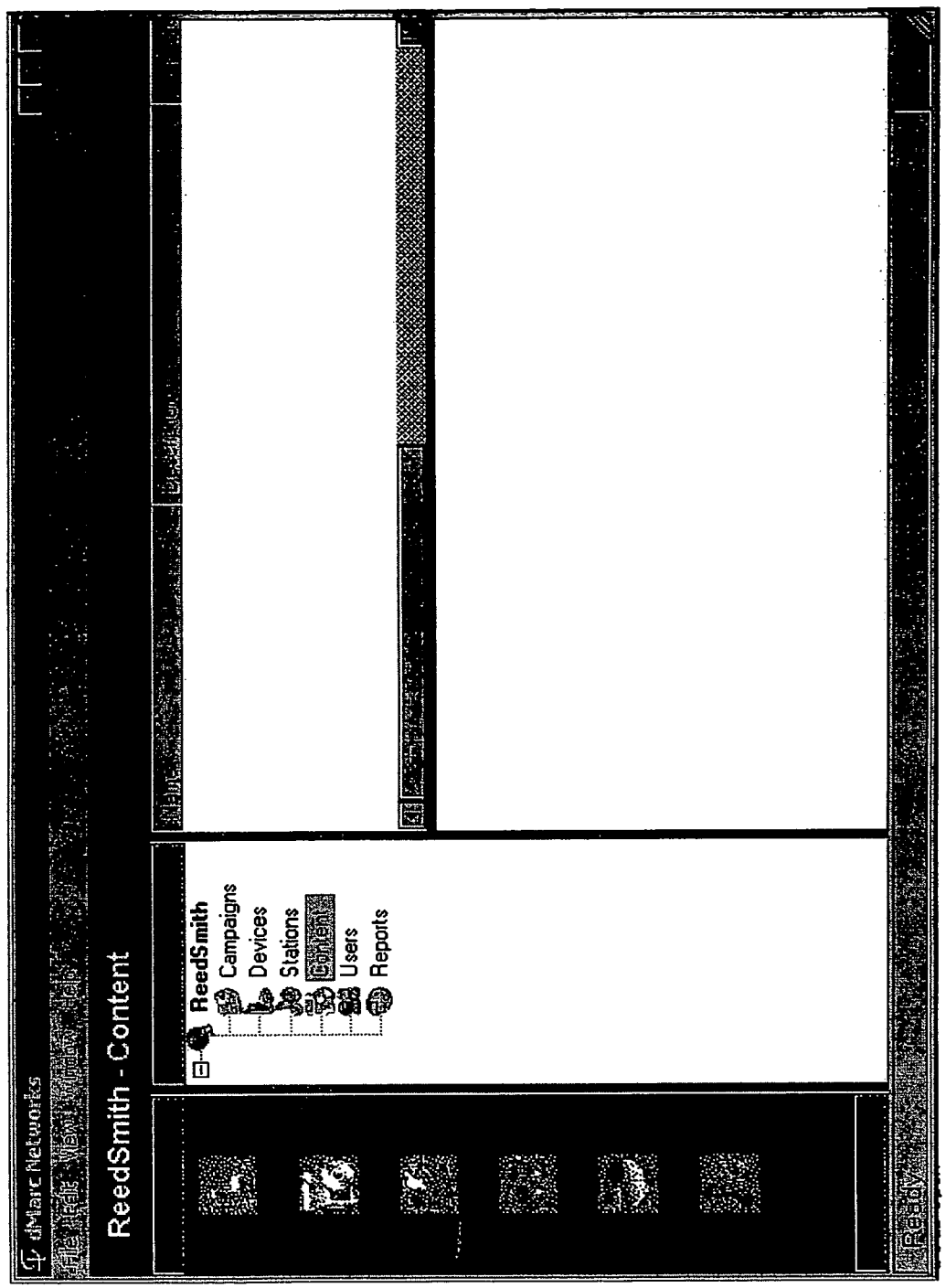
FIG. 4 illustrates a screen shot of a software embodiment of the hub according to an aspect of the present invention.

Referring now to FIG. 4, there is shown a screen shot of a software embodiment of the hub according to an aspect of the present invention, accessible via an input according to an aspect of the present invention. As is shown in FIG. 4, a split screen may be utilized. Such a split screen may illustrate virtual networks representing the highest level of the hub layers. As may be seen, various selections may be made from within the highest level of the hub, such as campaigns, devices, stations, content, users, and reports. Of note, a particular user may, for example, enter the highest level of the hub by entry of user-related information, such as a user name and a password, which user-related information may be permanently stored in a database associated with hub, and which user-related information may be corresponded within that database with a security access level. Only those highest level options available at that security level may then be displayed to that user upon login. In other words, the acceptable actions by each registered user of the system are stored in a database associated with the hub by corresponding an access level to each user in the database. Thereby, a hub administrator, or an external party administrator, may allow for creation of, or create, users with differing permission access levels, such as for access to each highest level virtual network, and/or to each sub-network within each highest level network. Also, as illustrated with respect to FIG. 4 and hereinthroughout, in a preferred embodiment, the present invention is "wizard" driven, wherein a user need not be experienced with creation of particular outgoing communication types, but rather need only know what message is desired to be sent, how often, via what mechanisms, and to whom.

Figure 5:
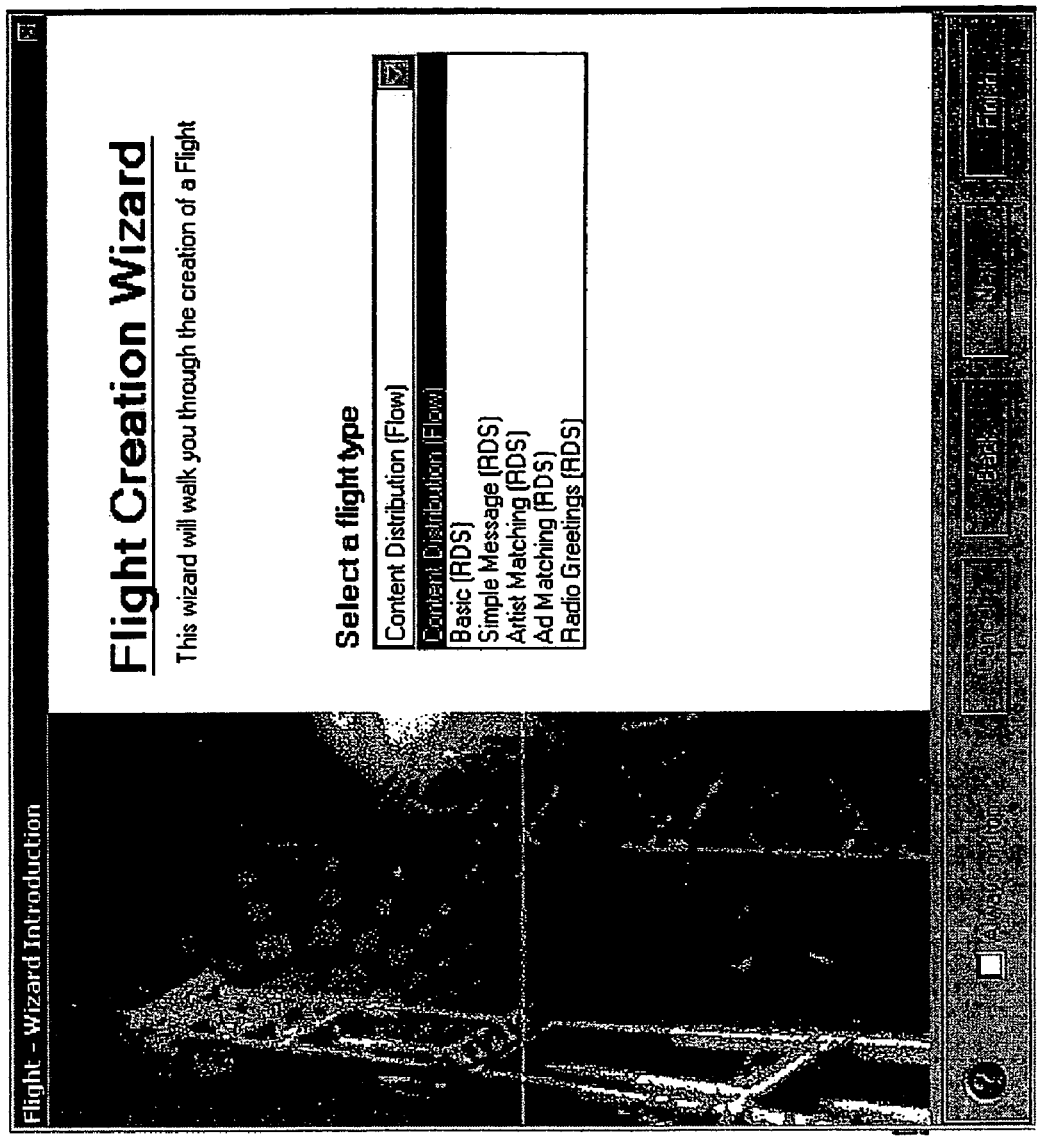
FIG. 5 illustrates a screen shot of the entrance to the campaign creation guide according to an aspect of the present invention.

Referring now to FIG. 5, there is shown the screen shot of the entry to a campaign creation according to an aspect of the present invention. As may be seen in FIG. 5, campaigns may be selected, for example, for a content distribution, basic RDS delivery, simple messages, artist matching, ad matching, and/or radio greetings. The user may select one or more of the delivery mechanisms, and may then click the next button to move to the next window.

Transactions may be built in, or may access, another environment, such as e-Bay or Google, for example, thereby reducing the speed dependence and multiple interaction point dependence of a user of the present invention. For example, a user, via an input to the hub, may request the monitoring of the internet for a particular communication item, such as an auction item or an article regarding a particular subject. The hub may monitor, such as via an external engine such as eBay or Google, for the particular communication item instructed by the user in the input, and, upon locating the particular information item, the hub may take action via the outputs. For example, the hub may place a bid in an auction at a predetermined price or time, or may send a comment on an article or download the article. Further, the hub may engage asynchronous requests, such as wherein a first user may make a request for information, and the information, once located, may be sent to a second party.

The business layer, as discussed hereinabove, may take the form of one phase or multiple phases and is entrusted with preparing information for delivery. The information in the example immediately hereinabove requesting an auction bid of less than $250 for auction item AA at auction locations X, Y, or Z to be bid at less than 1 minute remaining in the auction of item AA may be entered from the input into the business layer, and a script may be run monitoring for the desired auction at the desired price within a predetermined time constraint, such as a user-clicked option selection of "Do not bid until auction time remaining<1 minute" (the user may, for example, be provided with a limited number of such options to select from), and, upon location of such an auction this information may be output from the business layer to the delivery mechanism for delivery to the auction site. The script may specify data delivery points and the protocols necessary to achieve proper delivery. For example, multiple data to multiple end points via multiple protocols, such as to multiple different auction sites, may be decided in response to single request. Further, an additional feedback loop with respect to the business layer may be created in order to prevent delivery from being the end point of the process. The data or information generated by the delivery mechanism may thereby be further utilized by sending it back to the business layer for reprocessing. For example, the placement of the bid by the output in the above example may cause the generation of an "outbid notice", informing that the user has been outbid, from the auction site. In such a case, the input of the outbid notice may be received at the input, may have a business layer script applied to that input, which may cause a new output, such as the raising of the original bid.

A campaign from the business layer may take the form, for example, of displaying a particular script on a radio receiving a broadcast from a first channel that radio channel broadcasts a given artist or particular song, such as on an RDS radio. The user may develop such a campaign by selection of predetermined elements from a template provided to the user at the input via the wizard, thereby requiring no specific knowledge from the user regarding specific delivery mechanisms. Further, a campaign may be based on selected content, wherein the content of the message correlates with content on the radio, for example, or a campaign may include content based on location of a recipient, for example. A campaign may be targeted across frequency or across networks, or both, for example, and content of the campaign may be varied to a desired degree as between delivery networks, for example. Additionally, multiple networks may be delivered based on a single advertiser campaign, for example. Thereby, decision makers, such as advertisers, may select transmission by weighing promotions within particular campaigns, or as between multiple campaigns by that decision maker, and by leveraging the delivery of those promotions to obtain the highest desired effect.

As an additional example, a campaign may be input from a single source, and may be sent via the outputs to multiple sources, such as in the form of any devices capable of receiving the campaign. For example, a children's television character, herein referred to as "Fluffy", may have associated therewith a plurality of toys, including, for example, plush dolls, poseable figurines, playsets, books, and the like, as may be apparent to those skilled in the art. Further, each of those toys may have an interactivity capability, such as the capability to speak to a child in the voice of Fluffy. Further, each of those toys may include the capability to receive, for example, radio broadcasts, or cellular telephone broadcasts. In such an exemplary embodiment, the user may, via the input, enter a campaign to the hub, wherein the campaign include a message regarding a new movie starring Fluffy. That campaign may then be sent from the output from the hub via the desired delivery mechanism, namely a radio broadcast or cellular broadcast, to the toys. Thereby, each toy may receive the campaign message via its appropriate receiving mechanism, and the campaign may be output from all necessary multi-simulcast points and mechanisms, and at necessary or desired repetition or redundancy levels, to ensure delivery to all desired devices.

Campaign metrics may created within each step of the campaign wizard, such as, for example, the demographic of a listening audience may be assessed based on the type of music played by a radio station. Also included in a metric may be the strength of the signal of the assessed broadcast, and the population coverage that is resultant therefrom. These metrics may be thereby used to determine market penetration. Further, these metrics may draw on additional needed information to calculate the metrics, such as by automatically accessing an information store, or time stamp, from an accessible internet site to allow for the calculation of the metric. Thereby, user input information, and automatically accessed information, may be merged to provide the necessary metric. Using campaign metrics, a weighted advertising campaign may succeed in achieving a certain market penetration.

Such campaign metrics may allow, for example, for pricing variability to allow for maximization of profit. For example, advertisement or personal greeting campaigns that are input to the hub may be charged according to the popularity of each station, by time of day, by desirability of the assessed target market segment of each station, by date, or the like. This may allow, for example, an advertiser to bid different rates for the same ad blocks on different stations, or at different times of day, via a single input from the advertiser, and have those bids go out the desired multiple outputs from the hub in accordance with the campaign. Further, the stations that sell and provide the ads to consumers may enter variable pricing input of minimum acceptable pricing for, for example, times of day or audience type. Thereby, corporate revenue information may be provided via the present invention, in real time, for all sides of a transaction, such as an advertising transaction. More specifically, for example, an advertiser may enter variables at the campaign input for the campaign to be sent, such as assessing playlist content for four particular radio stations over 14 days, via the campaign, sending that information back to an additional aspect of the campaign, and having that additional aspect of the campaign insert the name, such as on a cell phone or RDS radio, of each one of the three artists found most often in the 14 day playlist when that artist is played by each of those four stations, and having the cell phone or RDS radio scroll upcoming concert information sponsored by that advertiser for that artist upon display of the name of that artist. Upon entry of the campaign to the input to the hub, the advertiser would have input the target devices for the campaign, and the metrics desired to select the artists and the stations. Further, based on the metrics, the advertiser may best allot limited resources, such as targeting a $10,000 buy to those four stations based on the number of times the concert information is displayed. Thereby, corporate revenue is tracked in real time, and a single campaign may automatically build other campaigns and/or campaign aspects.

Figure 6:
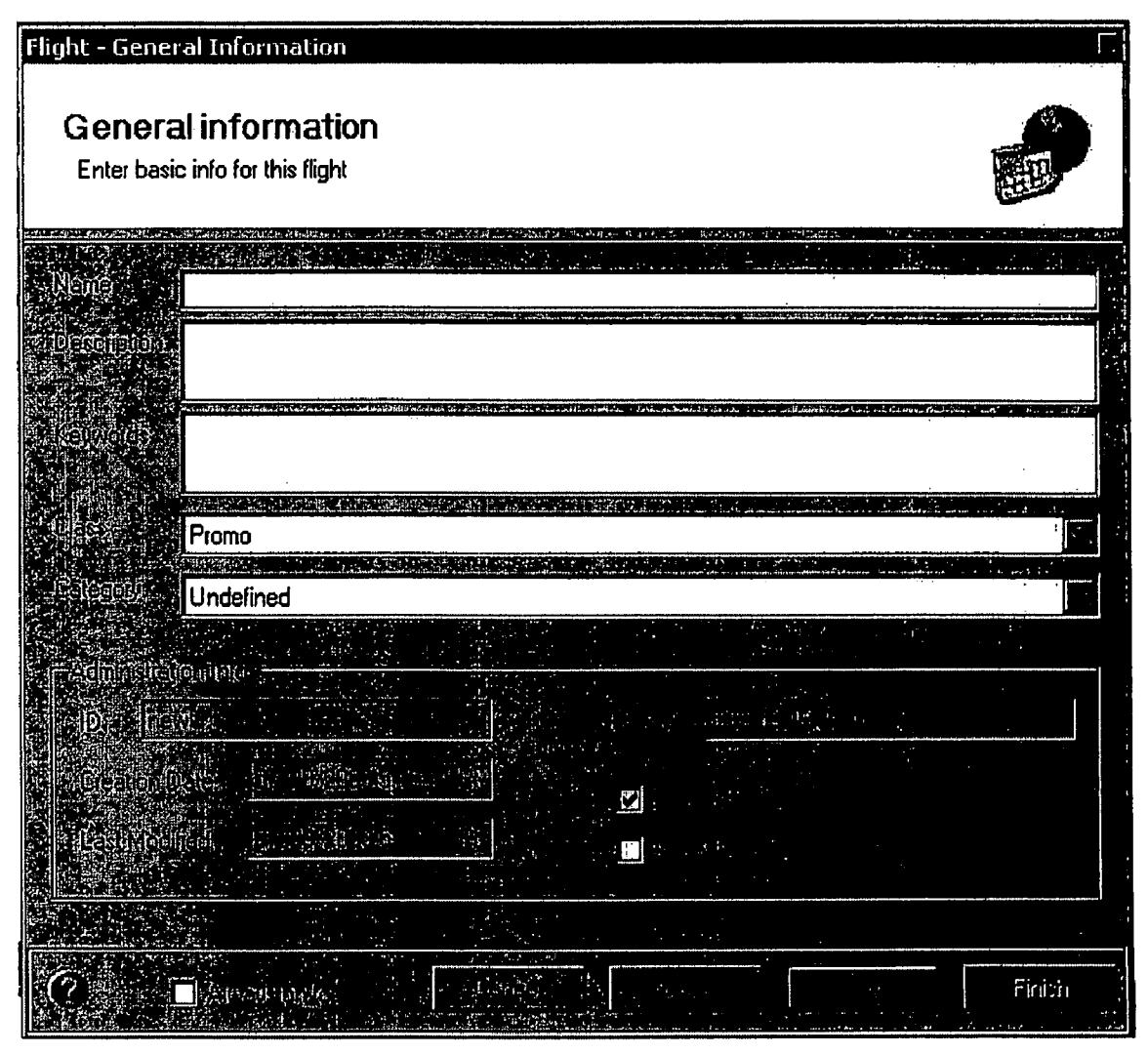

Referring now to FIG. 6, there is shown a screen shot of a general information screen used for the creation of a campaign. Basic information may be input by a user, such as the name of the campaign, a description of the campaign, and a class of the campaign. Upon entering this information, the user may click on the "next" button to enter and save the information and move to the next window.

Figure 7:
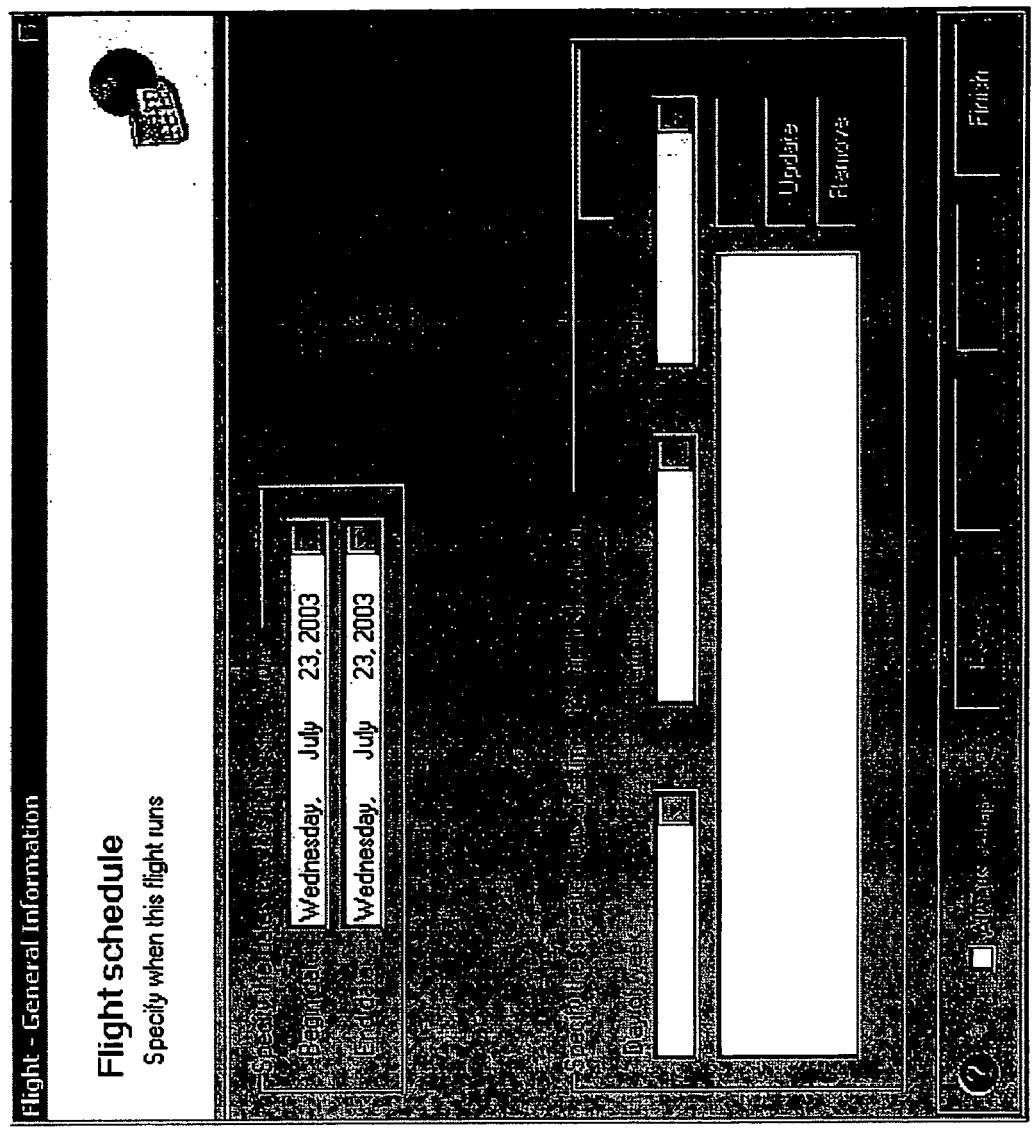
FIG. 7 illustrates a screen shot of the scheduling screen used during the creation of a campaign.

Referring now to FIG. 7, there is shown a screen shot of a scheduling screen used during the creation of a campaign. As may be seen in FIG. 7, the beginning and ending dates of the campaign may be entered. Specifically, the day of the week desired for delivery, the starting date of delivery, and the stopping date of the campaign may be identified. Once these parameters are entered, the user may selected the "next" tab in order to enter the information and move to the next layer, wherein the content for delivery may be selected.

Figure 8:
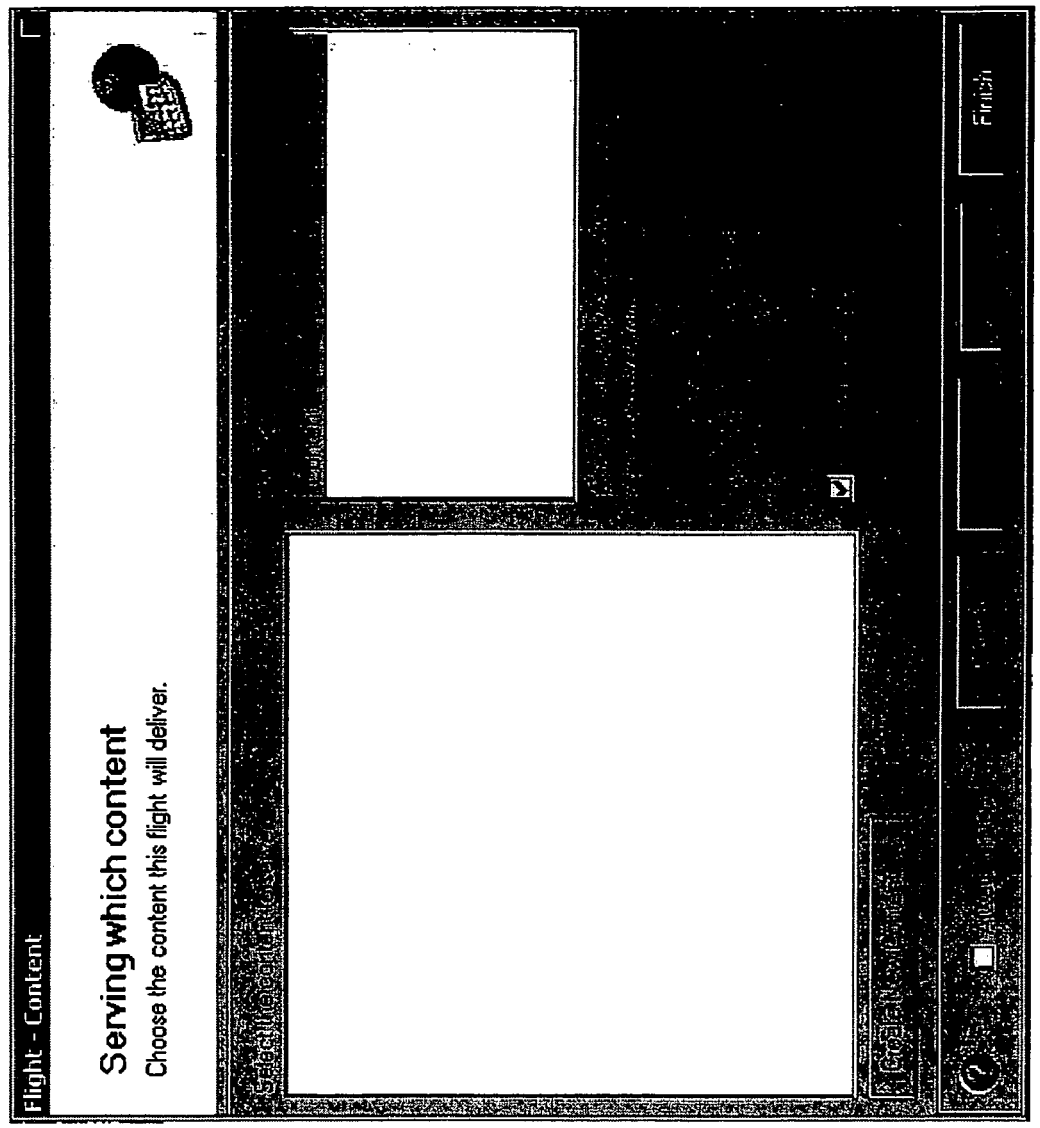
FIG. 8 illustrates a screen shot of the content selection screen.

Referring now to FIG. 8, there is shown a screen shot of a content selection screen. This window may provide an option of available content to be selected for delivery. This content, as may be described hereinbelow, may be created by utilizing the content selection tab of FIG. 4, for example.

Figure 9:
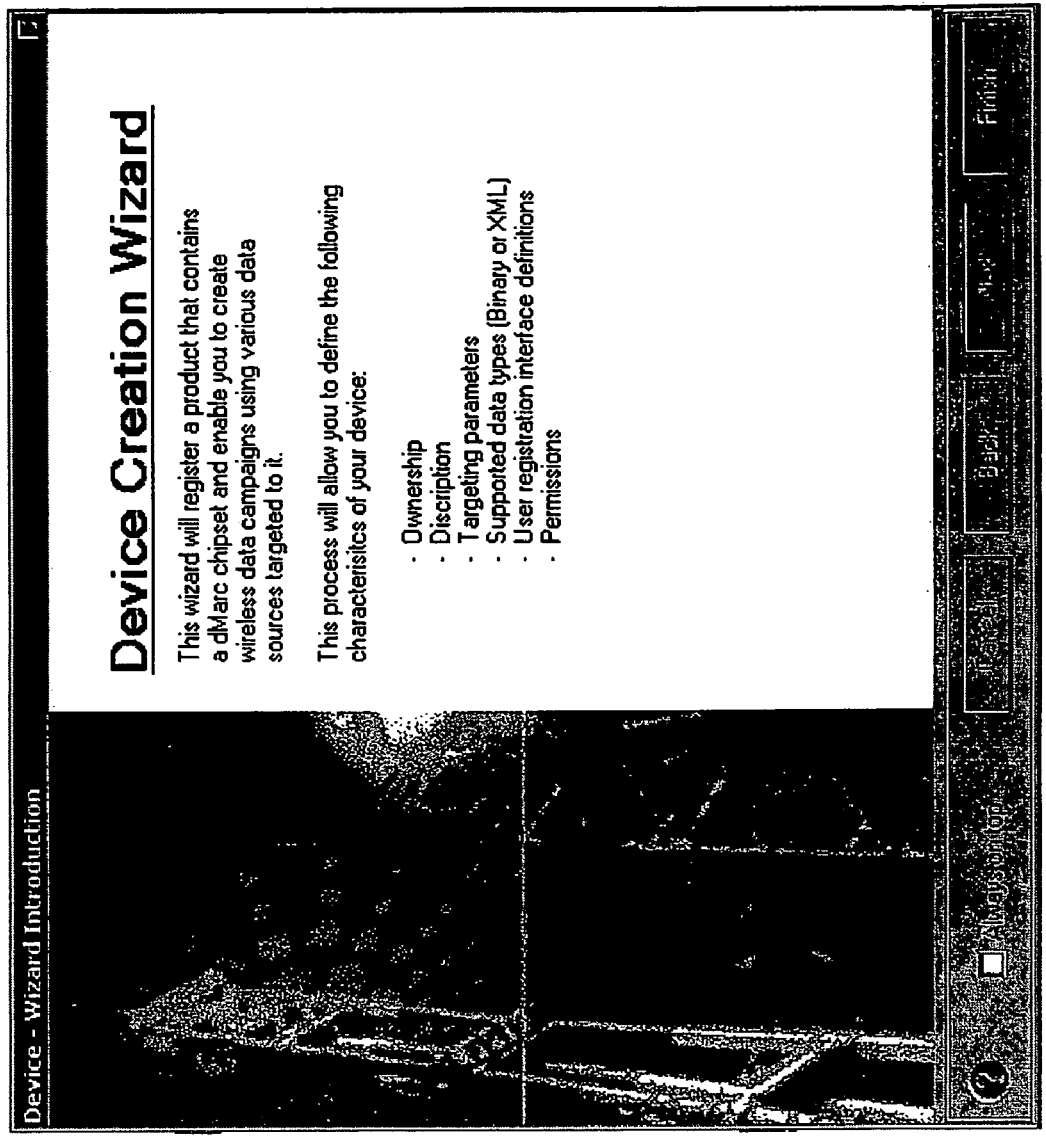
FIG. 9 illustrates a screen shot of the device creation screen associated with the device tab of FIG. 4.

Referring now to FIG. 9, there is shown a screen shot of a device creation screen associated with the device tab of FIG. 4. This selection may enable a user to step through the identification of a targeted device or devices according to an aspect of the present invention. Specifically, the user may be able to define ownership of a device, describe the device, target parameters of the device, including supported data types, and determine permissions for the device, for example. Each of the targeted devices may have associated therewith particular software or hardware communication aspects, certain of which may be selected from a screen similar to that of FIG. 9. For example, in order to insure delivery of a message to the appropriate device, a repeater may communicate with the hub. Therefor, a repeater box with a TCP/IP connection may be associated with the hub, for example.

For example, if the user elects to deliver a message to a radio broadcast, the user may select the desired station information. Depending on the length of the message, the hub may determine the time of the block needed to convey the appropriate amount of information. For example, if there is a message which corresponds to a 60 second data block, the radio broadcast may have a rate associate with it, thereby allowing a determination to be made on how to send the information to effect the appropriate data block. This may further be achieved by including, such as within or associated with a screen such as that of FIG. 9, an interactive rate card. Such a card may be fully or partially interactive, and, as may be apparent to those skilled in the art, may be available via a PC, or may be a physical card.

Device types which may be selectable via a screen similar to that of FIG. 9, and hence that may be utilized in the present invention, may include, by way of non-limiting example only, devices such as cell phones, television, radio, satellite, internet, PDAs and combinations thereof. Those devices may include or contain, for example, devices containing HD chip sets, such a IBIQUITY RADIO, Palm Pilot or the like operating systems, DDAs such as iBiz and Pocket Radio, and RDS radio chip sets, by way of non-limiting example only. With respect to certain of these devices, it may be advantageous for the devices, or the hub outputs, to lock in via an auto-scan mechanism. For example, a device may continuously, or at predetermined intervals, monitor the hub outputs for campaign information. In a more specific exemplary embodiment for an RDS side band, it may be beneficial for devices to lock in by auto-scanning, thereby enabling multiple devices to latch onto the same station.

The use of several of these exemplary devices with the present invention is illustrated in the exemplary embodiments of FIGS. 9-13. The device setup allowed by the exemplary figures provided herein may provide a user the opportunity to enter information regarding a device, such as, but not limited to, chip set type and chip set identification, as well as network identification, if desired or necessary by or from the user. However, default values may additionally be readily available to an inexperienced user, or, alternatively, one or more campaigns may be automatically generated that access the necessary information, such as via the internet, that return the necessary information to the inputs, and that allow for the necessary manipulation of the user-developed campaign at the hub.

Such ready assessment of necessary information may allow for simplistic re-assessment of developed campaigns. For example, if station KAAA is networks 5, 7, and 9 upon entry of the campaign, but network 9 is eliminated, such as by sale of network 9 by KAAA, the present invention provides adjustment of campaigns dependent on the status of network 9 as KAAA accordingly.

Further, the use of the present invention, including the assessment of communication formats and changes and updates to those formats, for the plurality of devices served by the present invention, provides improved success rates in the targeting of campaigns. For example, when transmitting information to a device, it may be necessary to incorporate the information into a format that the device is able to accept and utilize. While many formats may be utilized by many different devices, as is known to those possessing an ordinary skill in the pertinent arts, hereinbelow there is provided an exemplary embodiment of a handshaking between a device and a transmission. For example, a device may expect or wait to receive a prefix, which may trigger the device to begin listening for further information. The prefix may be followed by a header. This header may provide information to the device which the device may use to determine what form the remaining transmission takes. The header may be followed by the information data for the interface to that device, for example a weather receiver interface, thereby setting the device to the appropriate setting for receipt of the specific data to follow. Following the setting may be the actual information for the device to display or transmit. The format of the prefix, header, interface, or message information may intermittently be updated, varied, or changed. Such variations are readily handled via the use of the present invention.

Figure 10:
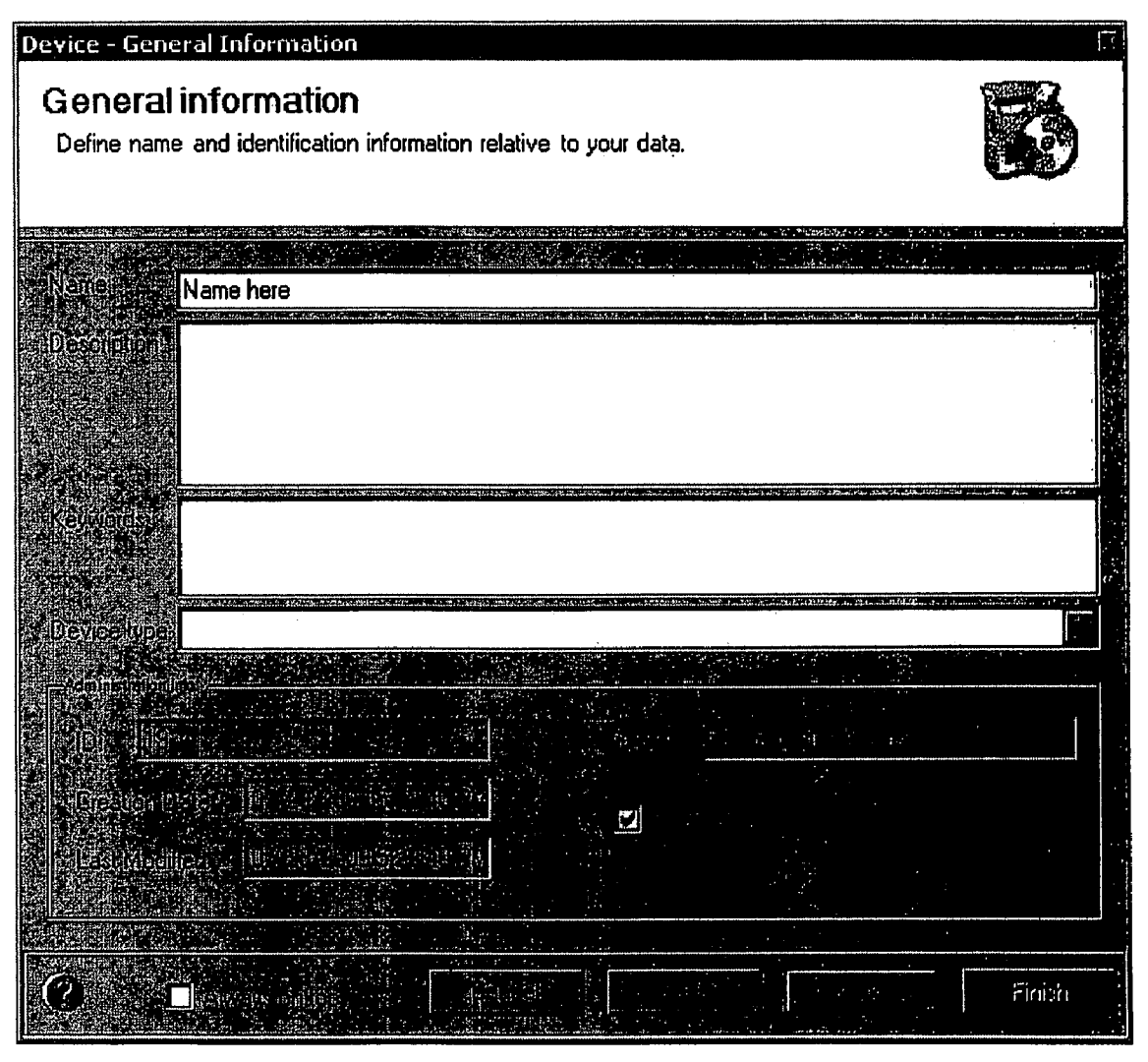

Upon selection of the "next" tab in FIG. 9, the user may reach the screen shot illustrated in FIG. 10. Referring now to FIG. 10, there is shown a general information window, which provides places for entry of information regarding the data of the device to be entered. As may be seen, a place for entry of the name, description, and keywords, as well as the device type, may be provided. After the proper data is entered in each field, the "next" tab may be selected.

Figure 11:
FIG. 11 illustrates a chip selection window which may be reached by selecting the next tab of the window shown in FIG. 10.

Referring now to FIG. 11, there is shown a chip selection window which may be reached by selecting the "next" tab of the window shown in FIG. 10. As may be seen in FIG. 11, the type of device may be selected and the chip code may be entered, thereby allowing communication directly to the device described. An alternative mechanism for entry of this information may be provided by recording information, such as the RDS chipset identification and the VIN# into which that chipset is placed, and the linking of that information to the sale of a vehicle and the name of the buyer, for example. In such an embodiment, a campaign may be automatically run from the hub to assess and update this sale of vehicle information at predetermined intervals. For example, if it is known that a chip with a given serial number is placed in a certain vehicle, the sales records may be monitored to determine to whom the car is sold. Upon this sale, the information may be entered into the system, thereby eliminating the need for the user to enter anything other than the name of the party to whom the user wishes to target the campaign.

Figure 12:
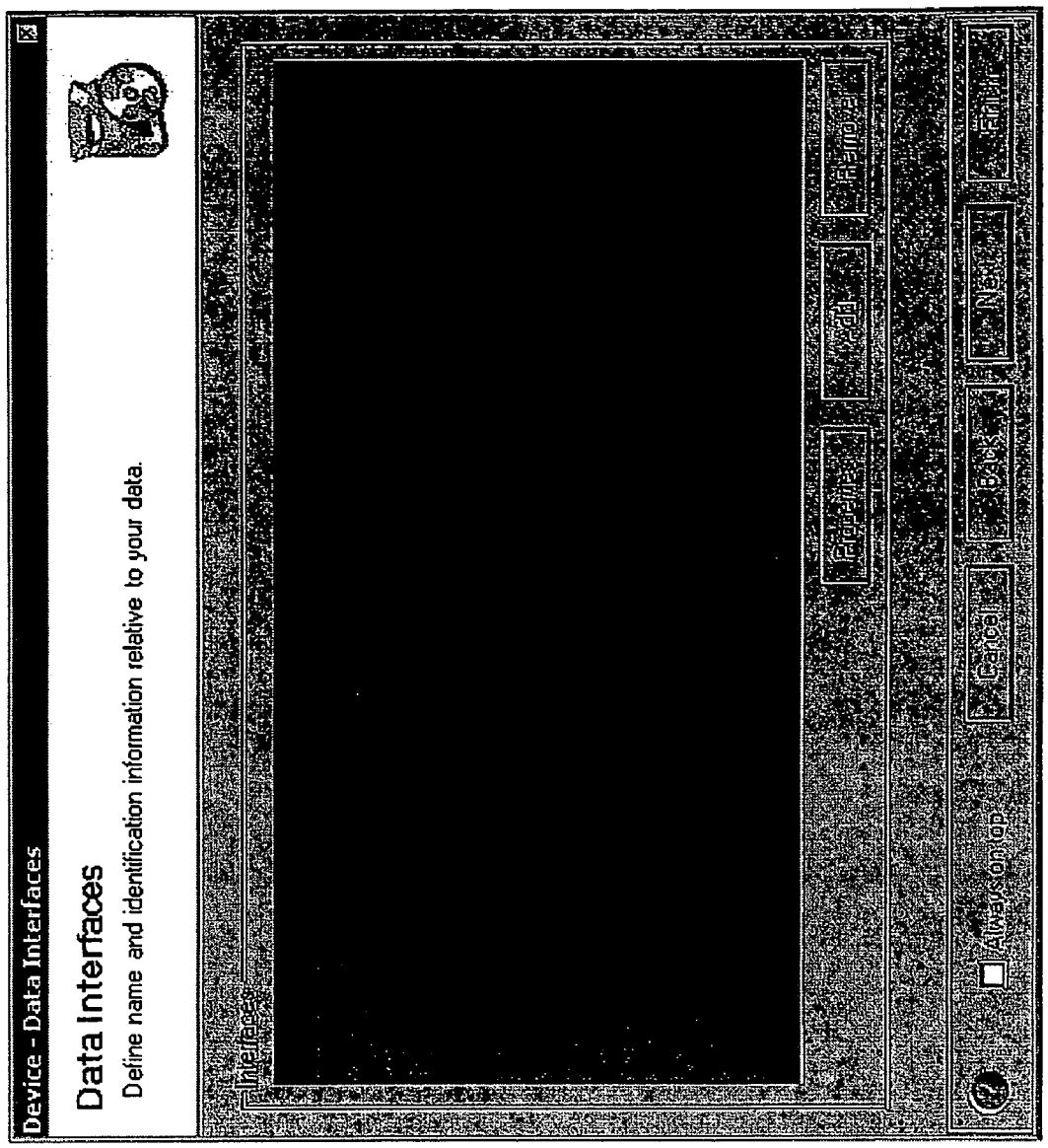
FIG. 12 illustrates a data interfaces window, reached by selecting the next tab of FIG. 11.
Figure 13:
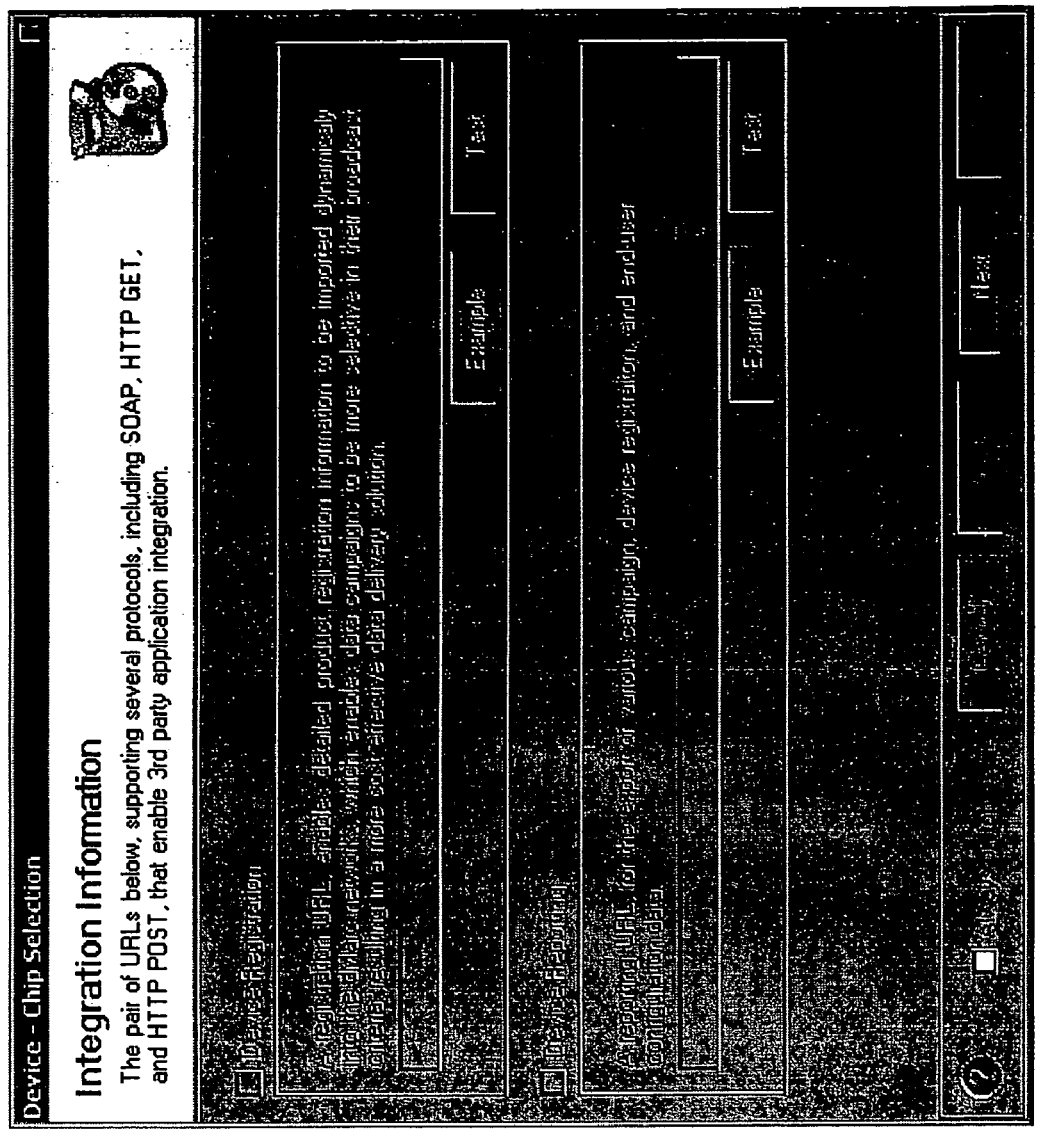
FIG. 13 illustrates a screen shot of the window to select integration of the chipset information.

Referring now to FIG. 12, there is shown a data interface window, reached by selecting the "next" tab of FIG. 11. This window may accept information relative to the device such as the capability and protocol information, and specifically what type of data the device may accept. Additionally, referring now to FIG. 13, there is shown a screen shot of a window to select integration of the chipset information. This may provide the user with the information to enable third part application integration of the chip.

Figure 14:
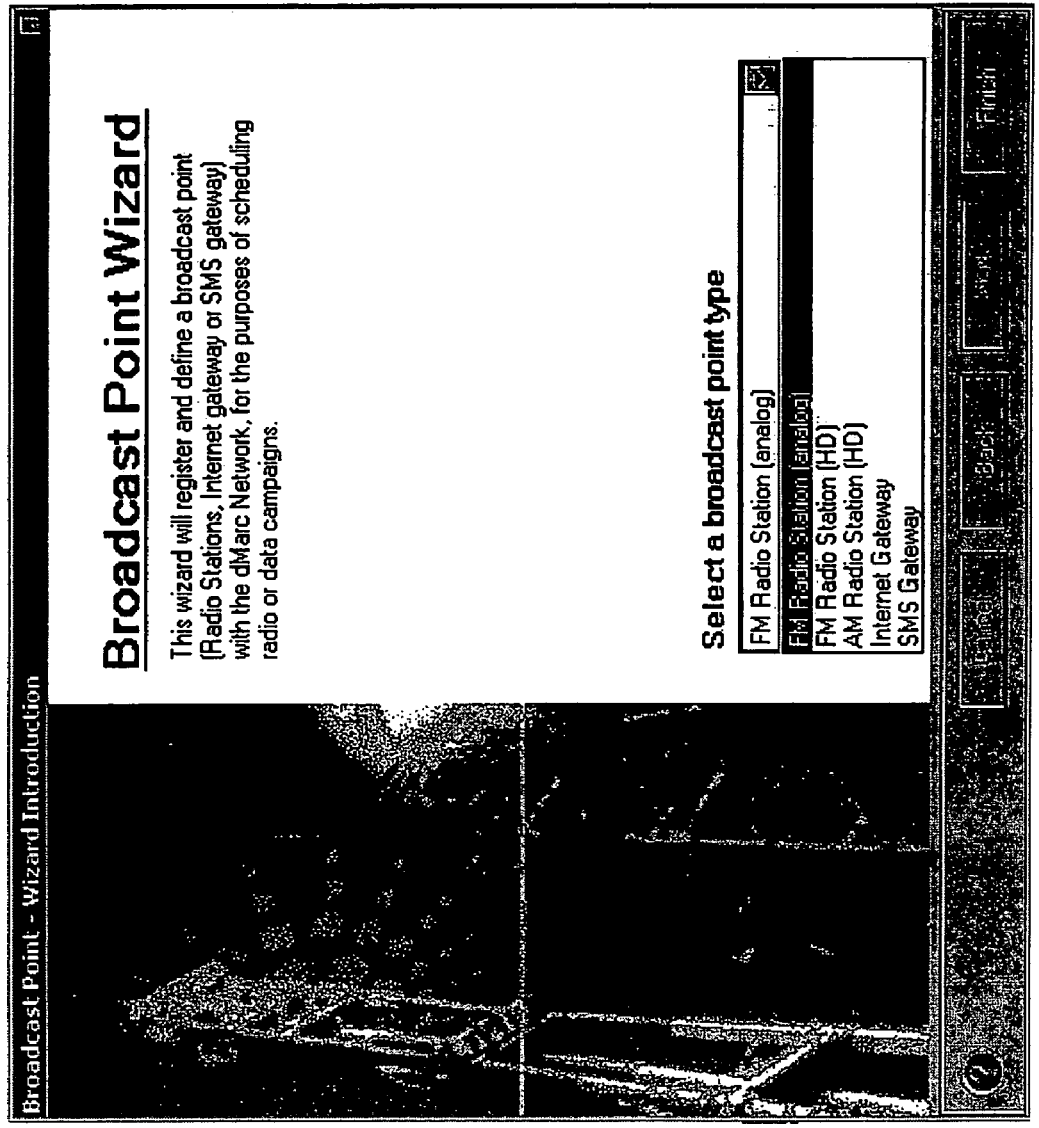
FIG. 14 illustrates the entry screen into the station tab.
Figure 15:
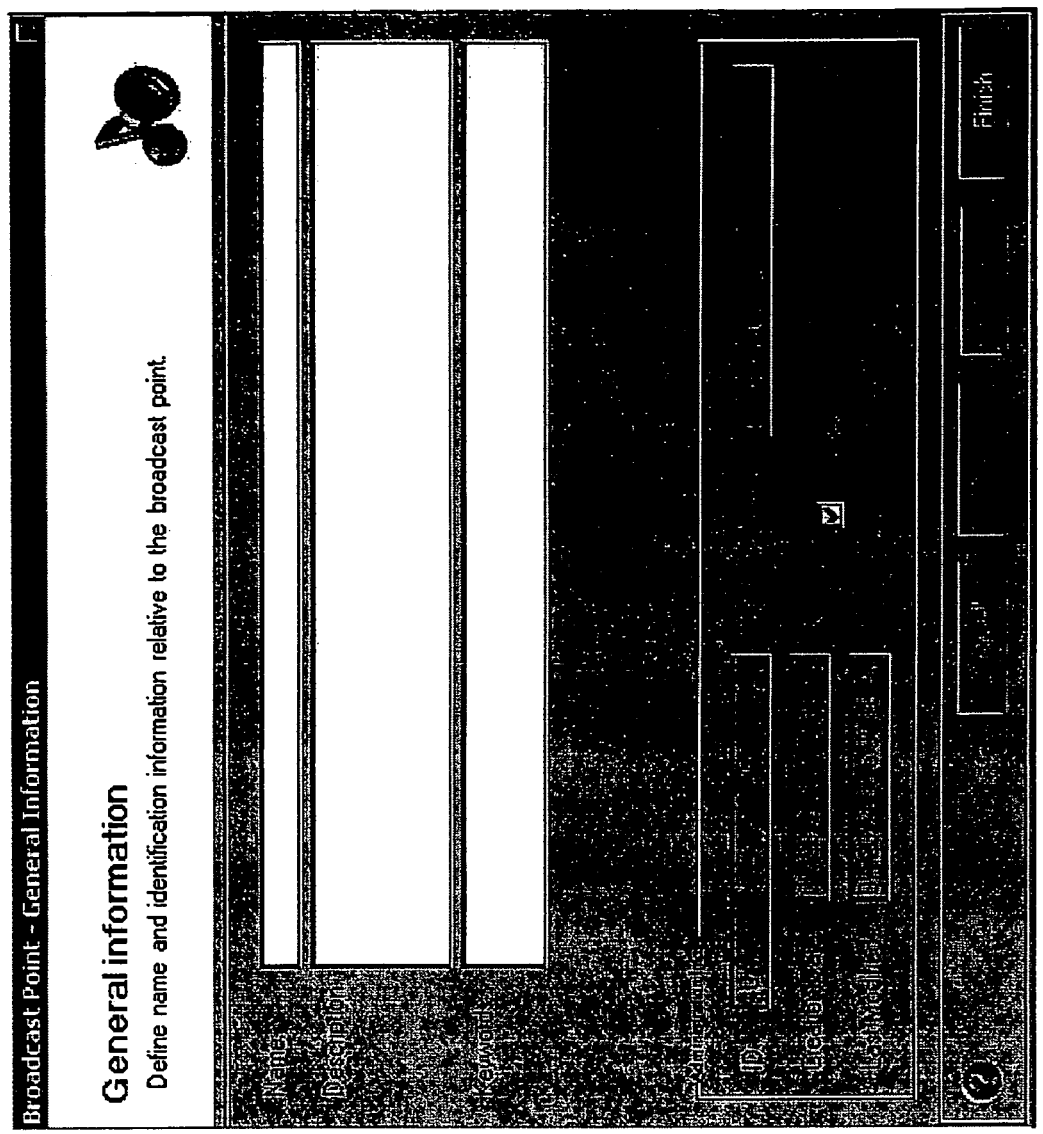
FIG. 15 illustrates a screen shot encountered after selecting the next tab of FIG. 14.

Referring now to FIG. 14, there is shown an entry screen into a station tab. As may be seen, multiple broadcast types may be deployed, such as FM radio in both analog and HD formats, AM radio, internet, and SMS. As may be seen in FIGS. 15-17, a broadcast may be developed to be deployed to certain of these various devices. Referring now specifically to FIG. 15, there is shown a screen shot encountered after selecting the "next" tab of FIG. 14. FIG. 15 provides fields for entry of information related to the broadcast such as name, description and keywords. Upon selection of the "next" tab, FIG. 16 may appear.

Figure 16:
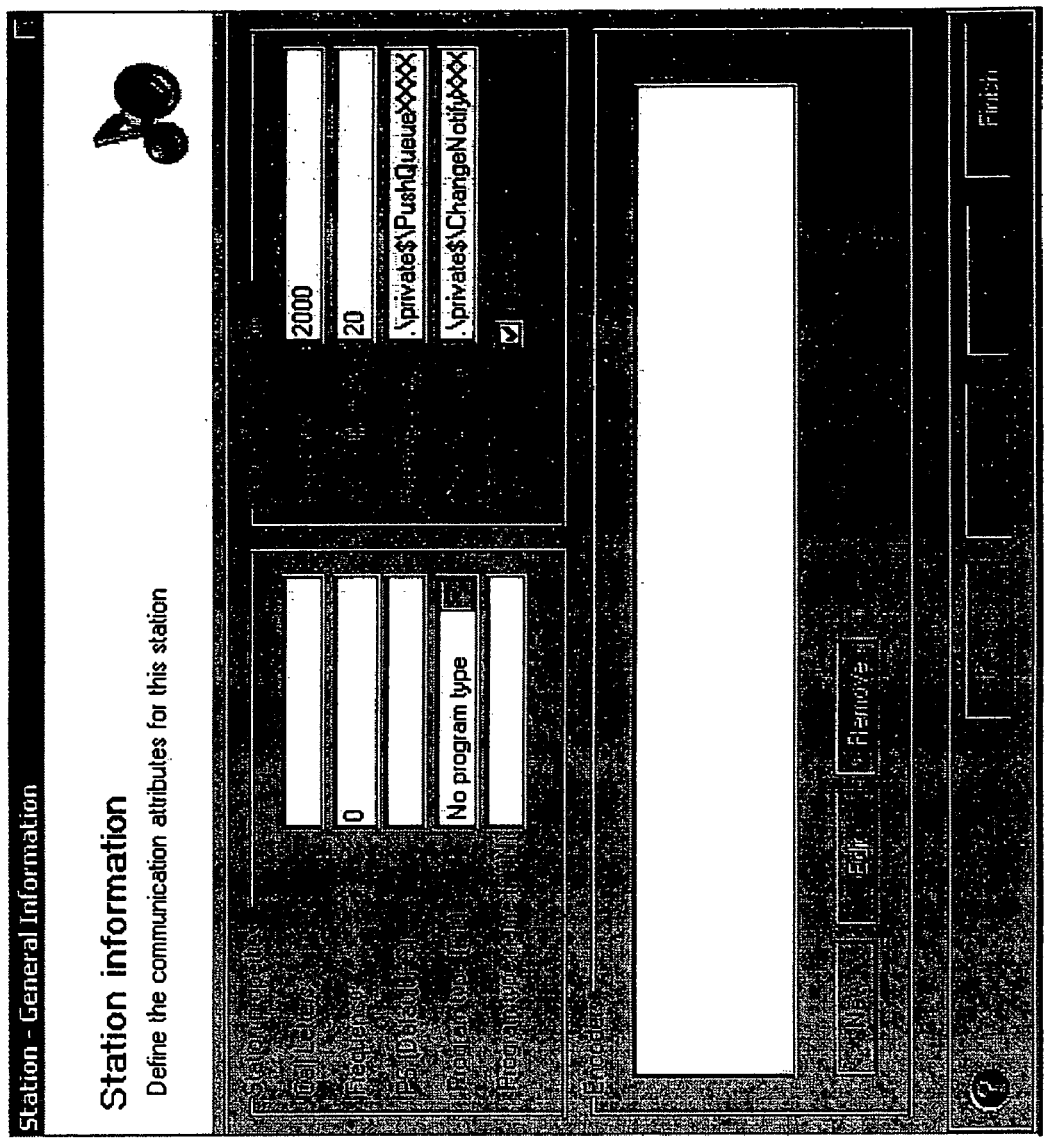
FIG. 16 illustrates a screen shot suitable for accepting information regarding the station selected as the broadcast.

Referring now to FIG. 16, there is shown a screen shot for accepting information regarding the station selected as the broadcast. Such data as the call letters, frequency, PS, program type and program type name may be entered. Upon entry of data into these fields and selection of the "next" tab, the window of FIG. 17 may appear.

Referring now to FIG. 17, there is shown a fees sheet associated with the station of FIG. 16. The user may determine the structure of fees with respect to delivery of information related to this channel. Such fees may include temporarily based delivery and exclusivity fees, for example.

Figure 18:
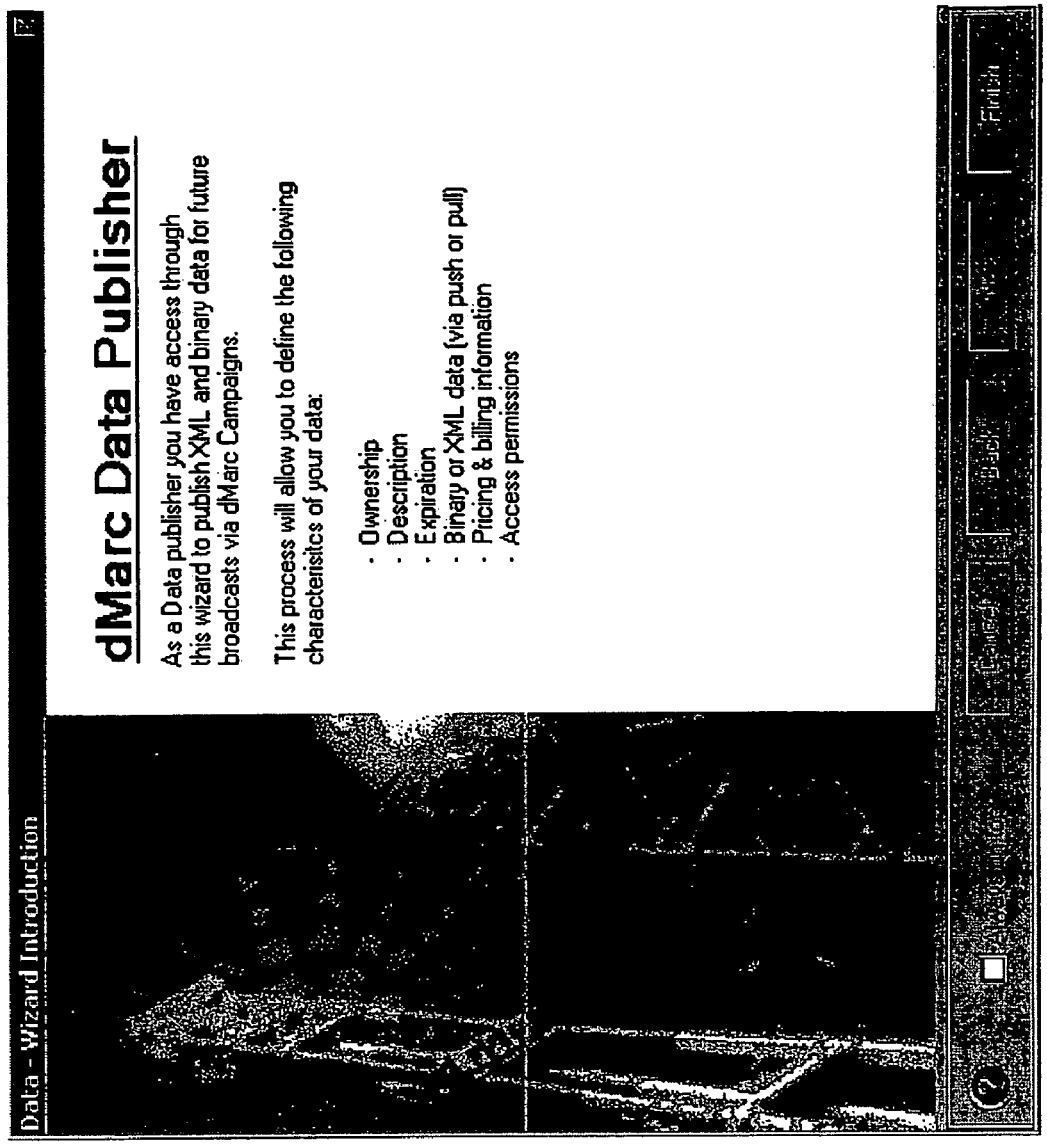
FIG. 18 illustrates the entrance screen shot of the content tab of FIG. 4.

Referring now to FIG. 18, there is shown an entrance screen of the content tab of FIG. 4. As may be seen on FIG. 18, the content wizard may be used to define the ownership, description, expiration, data type, pricing and permission of particular content, for example. As may be seen, the content layer is preferably wizard based and may share information with billing or revenue tracking, including external application exportation for revenue tracking if selected by the user. The exemplary embodiment shown in FIG. 18 is designed for a radio transmission to a car, but alternative embodiments may be readily understood by those possessing an ordinary skill in the pertinent arts.

The data type to be pushed over the network is determined within screens such as those discussed hereinabove. For example, this determination may be made based on the type of device that the transmission is being delivered to, or based on other reasons apparent to those possessing an ordinary skill in the pertinent arts. For example, data may be pushed to a URL address, or email account, with the caveat that utilizing such a destination may necessarily limit the amount of data that may be pushed to those destinations because of allowable file size or other constraints.

According to an aspect of the present invention, a data feed may be used as an input to the hub, such as to identify what is playing and when on a radio station. Such a data feed may be used to identify songs, including artist, album information, and song title, by way of non-limiting example only. These data feeds may further identify advertisements, such as by identifying that an advertisement is playing and any pertinent information relevant to the advertisement. Other types of data may be identified through the use of a data feed, as may be understood by those possessing an ordinary skill in the pertinent arts.

In order to incorporate external data feeds, such as to view a radio station web site to assess the playlist, and incorporate album information from a third-party web site upon assessment of the artist then being played according to the station web site, the present invention preferably includes a normalization engine. For example, in an exemplary embodiment of the present invention, all data incoming and outgoing may be normalized within the business layer to a uniform format, such as XML. Thereby, all input data from any source, including voice, internet protocol, text, and the like, may be converted to XML. Further, all data output as a campaign from the hub to the outputs after the business logic has run may be output as XML and converted to the outbound device format by the output interface. Thereby, any data may be exported, such as for editing, scripting for action, assessment of test scripts and campaigns, or viewing in third party application software, from the hub. Both inputs and outputs from within the hub may thus be simplistically viewed as a string of a uniform data format, such as XML.

Figure 19:
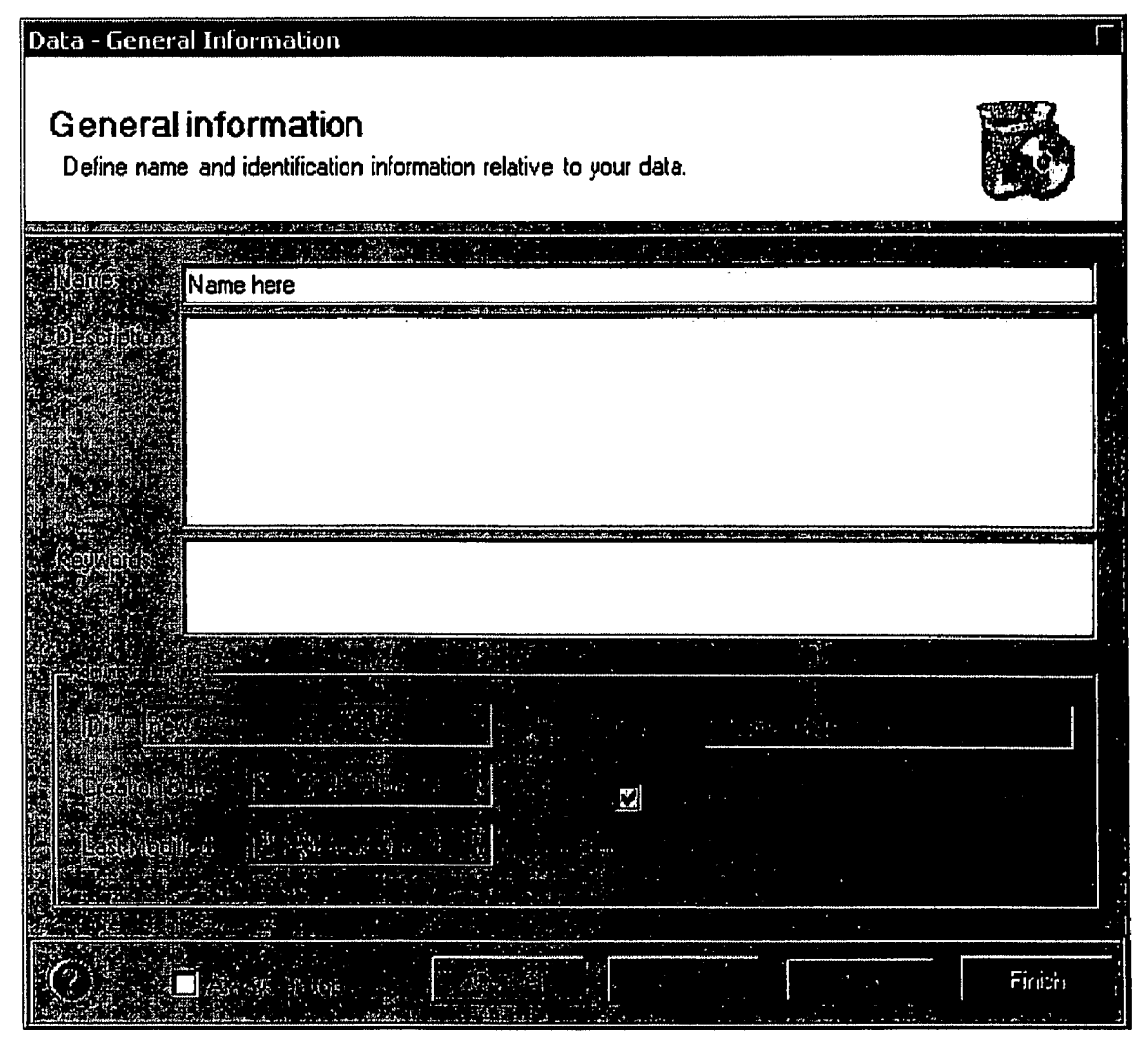

Referring now to FIG. 19, there is shown a screen shot of the screen used to provide a fillable file associated with the content general information.

Figure 20:
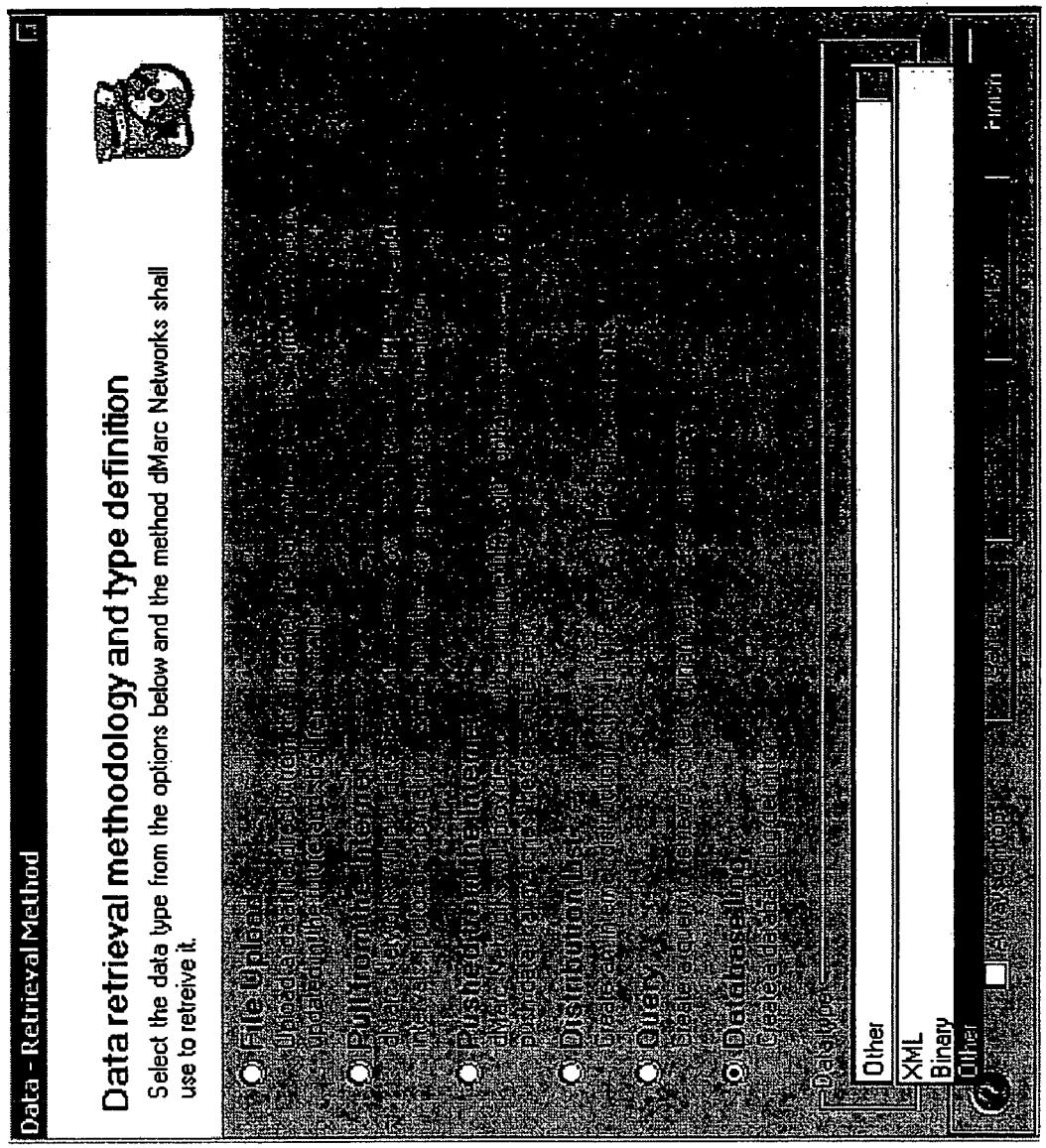
FIG. 20 illustrates a selection menu associated with the content type to be entered.

Referring now to FIG. 20, there is shown a selection menu associated with the content type to be entered. This provides an option to select the type of data, such as XML or binary, for example. Further, a selection may be to upload a file, pull a file, push a file, create a distribution list, query to retrieve content based on a key, or create database log definition, as may be seen in FIGS. 21A-F, respectively.

As discussed hereinthroughout, the present invention may be designed to receive or accept data from a multitude of sources, as may be more specifically seen in FIG. 20. The system may accept data in any of a plurality of acceptable formats, which acceptable formats may, in turn, be normalized for application in the business layer, as discussed hereinabove. For example, a network may be created for the transfer of information. Within this network, an interface may be created to allow the user to enter information. This interface may include email, for example, wherein the data may be in comma separated variable (CSV) format, for example. As is known to those possessing an ordinary skill in the pertinent arts, CSV may be data in a comma delimited format. The system may share data with the established network, and data from a user may be returned by email, for example.

Thus, data received from the multitude of sources in different formats may be independently interpreted from each source and standardized. For example, the system may access a HTML webpage, pick the desired data, and convert to XML format for input to the logic of the business layer. Further, in the course of normalization, data may be filtered. This approach to data interpretation and importation may permit a broader user base. For example, police stations may be able to send data without changing or manipulating dispatching, or dispatch program management software. Each different police format may be received, standardized, and prepared for manipulation. As may be apparent to those skilled in the art, the present invention may thereby provide greatly improved 911 response, for example, by provision of a capability for a single source input in a first format, normalization of that format, and outputting of an emergency response campaign to multiple broadcast points without regard for the formatting required by the recipient of the campaign, to thereby allow for dispatch of the most readily available response personal in response to the initial single source response request. Further, such an embodiment may provide an example of the brokering of business logic. For example, a first user may take a first data set, manipulate that first data set, and create content, and may send that content to a second user, who may then manipulate the first content with additional content, and output new content. In the specific 911 example, a first user may input first data, which a campaign may normalize and manipulate and send to police, fire, and ambulance personnel. The fire personnel may then add new content to the received content, such as "hazardous chemicals located at fire location", and that new content may be re-broadcast to police and ambulance, and broadcast to chemical response teams.

Action on transformed data may be incorporated into a workflow, such as in a workflow markup language (WFML). According to an aspect of the present invention, a document or an input may be parsed, for example, and an application wizard may define, or may allow user definition of, a parsing script. Further, other defined aspects of information may be received or defined. For example, data may be received in a synchronous or asynchronous fashion. Synchronous may be defined as data received from a source in which the method of communication, such as a socket, for example, remains open. This open communication may allow data to be delivered directly to and from this source.

Figure 21:
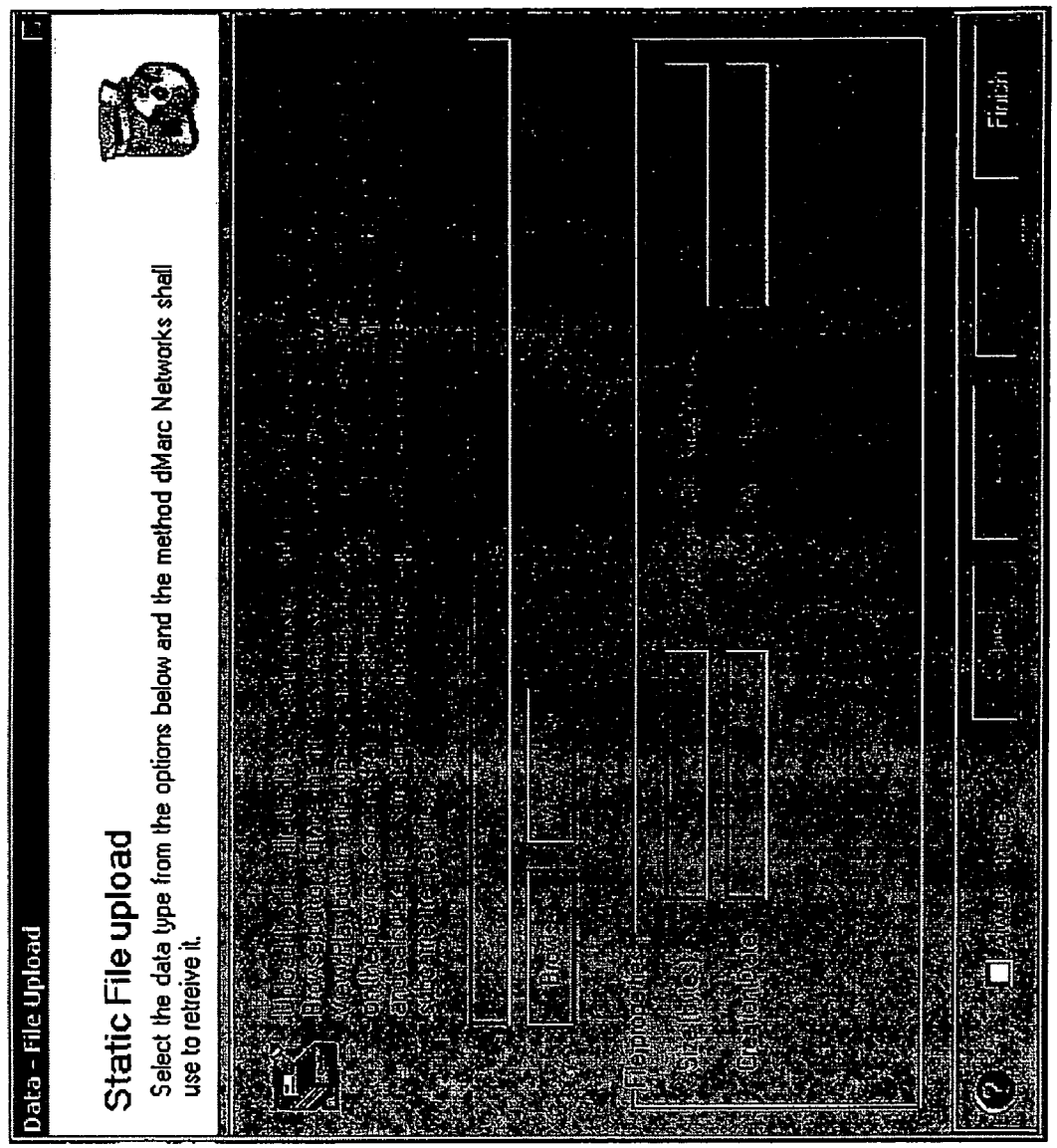
FIG. 21A illustrates a screen shot of the screen reached when static file upload is selected from the menu of FIG. 20.
FIG. 21B illustrates a screen shot for file pulling of FIG. 20.
FIG. 21C illustrates a screen shot of the window reached when the push selection of FIG. 20 is selected.
FIG. 21D illustrates a distribution list screen which may be reached by selecting the appropriate selection in FIG. 20.
FIG. 21E illustrates a query definition list screen which may be reached by selecting the appropriate selection in FIG. 20.
FIG. 21F illustrates a database log definition screen which may be reached by selecting the appropriate selection in FIG. 20.
Figure 21:
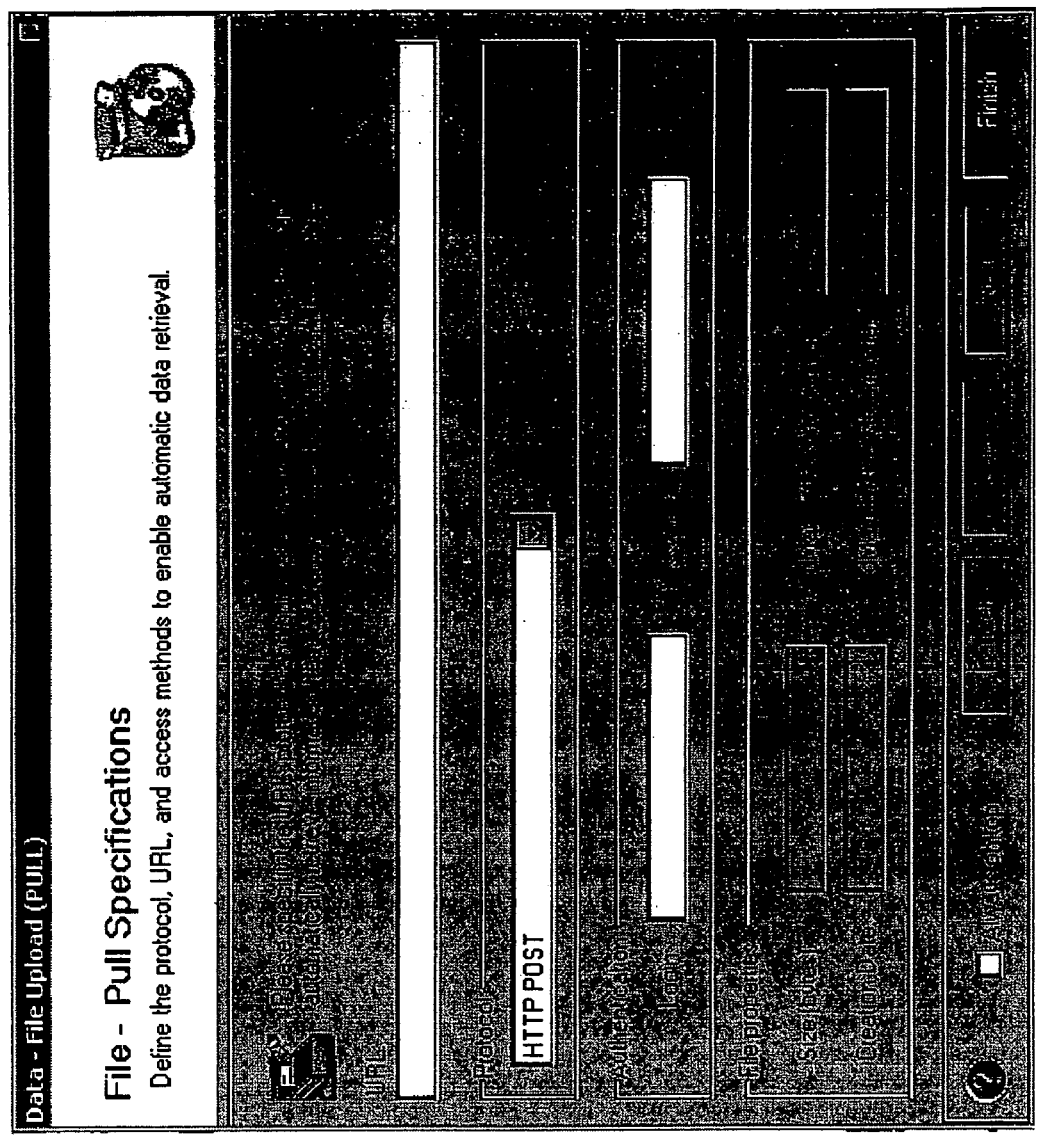
Figure 21:
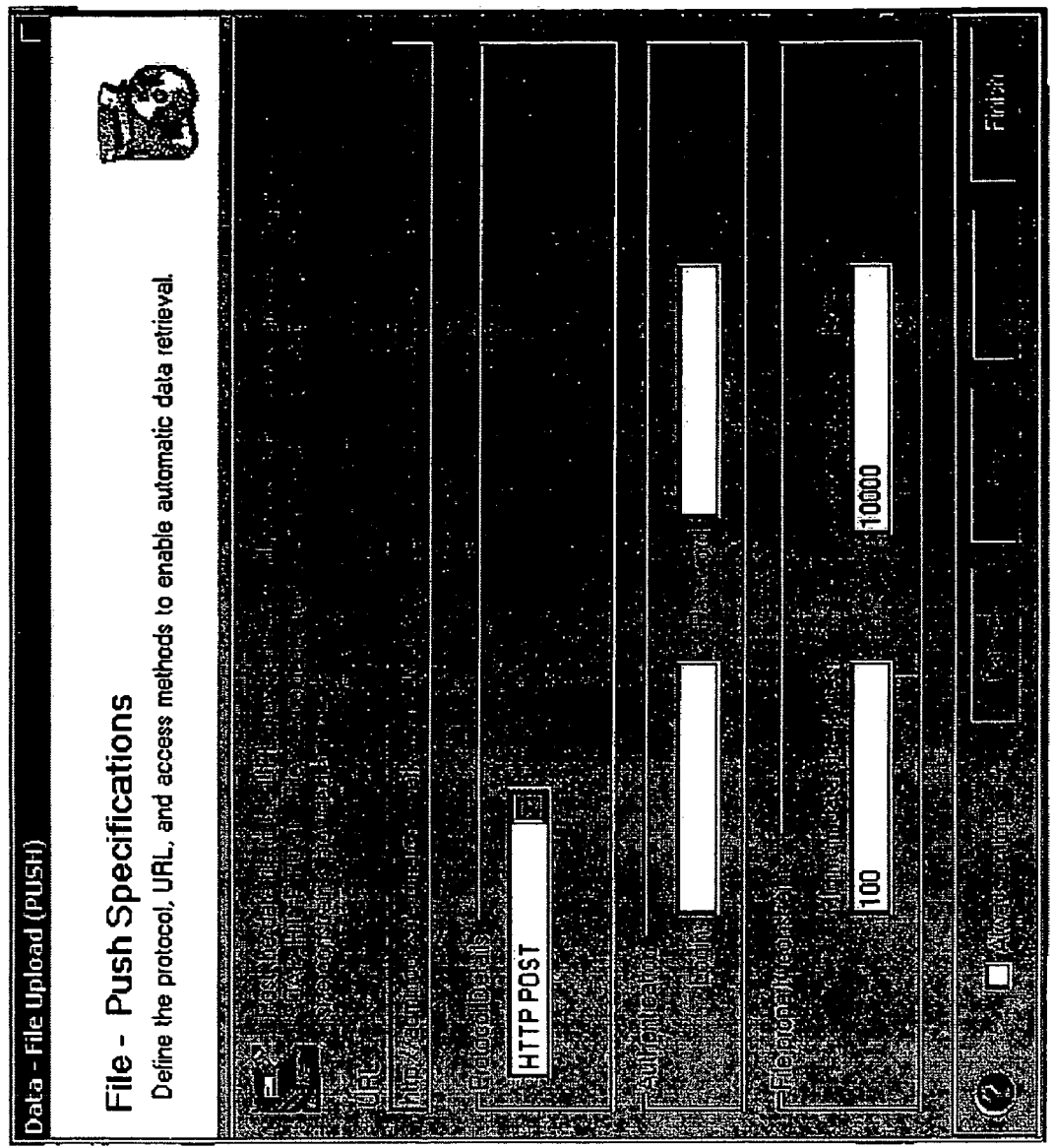
Figure 21:
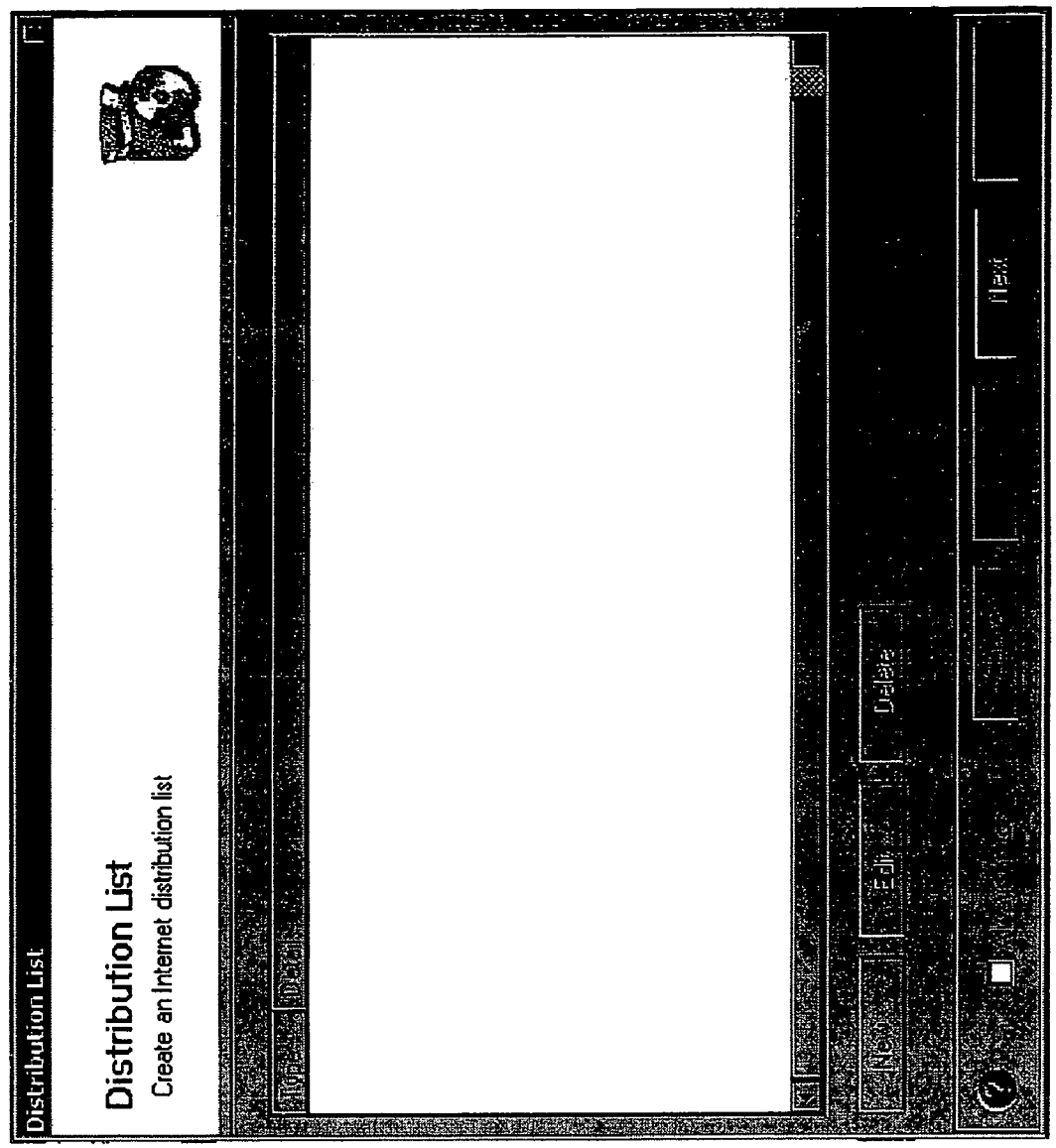
Figure 21:
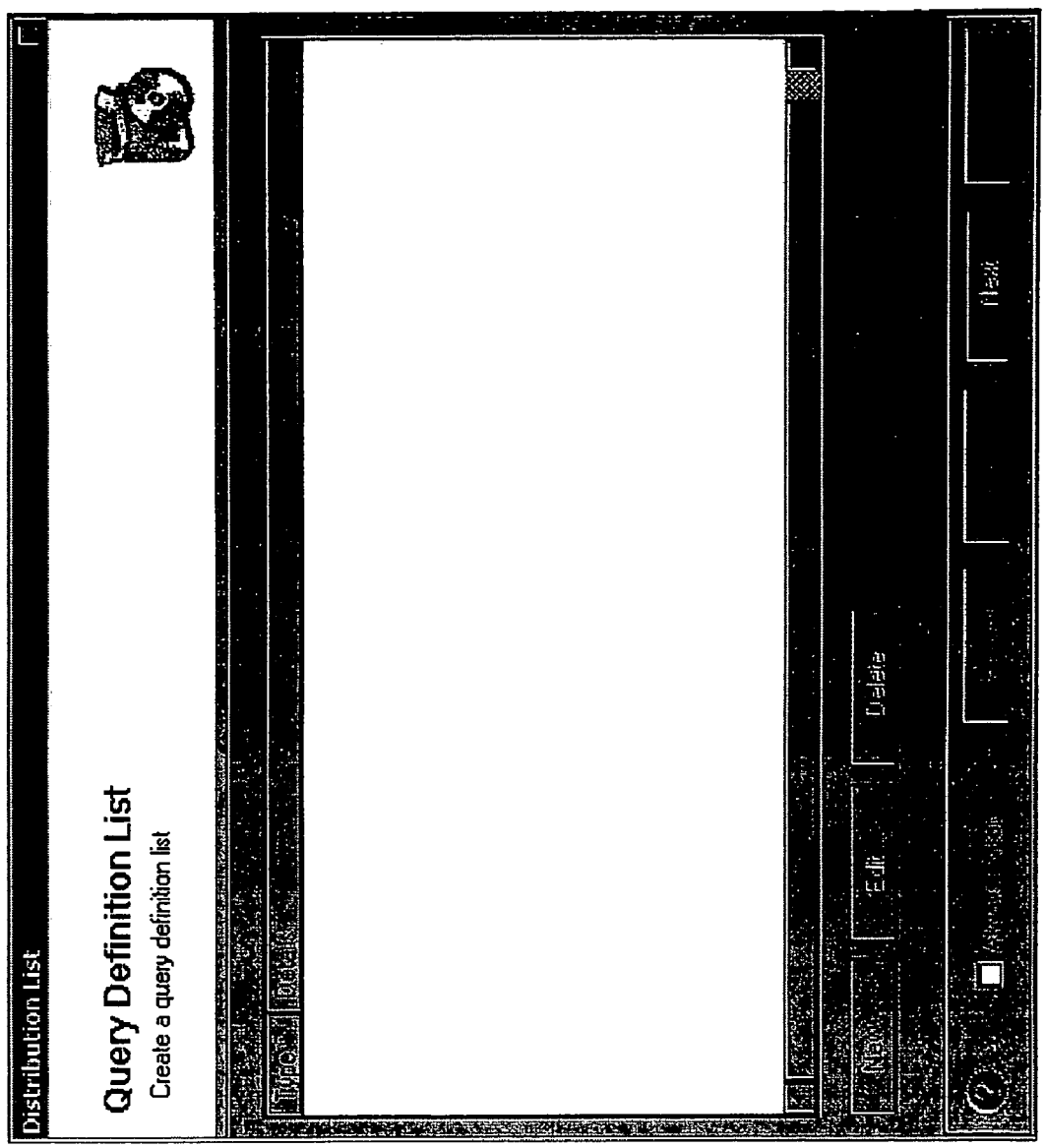
Figure 21:
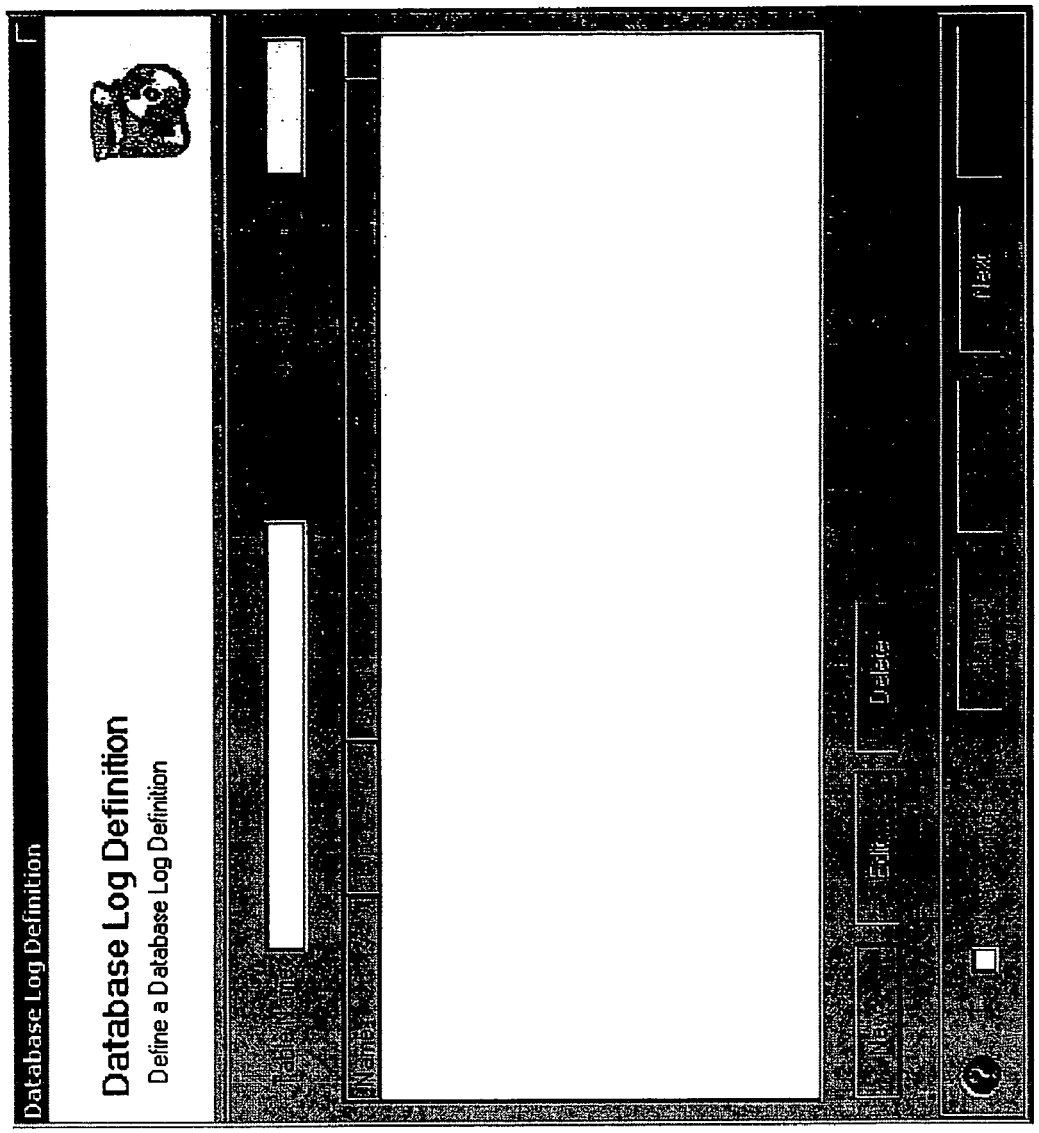

Referring now to FIGS. 21A-F, there are shown screen shots of windows that may be reached by selecting the various options in FIG. 20. In FIG. 21A, there is shown a screen shot of a screen reached when static file upload is selected from the menu of FIG. 20. As may be seen, this provides the necessary interface to upload data to the system repository by searching and selecting a file from a network, local, or otherwise accessible drive of a computer.

In FIG. 21B, there is shown a screen shot for file pulling of FIG. 20. This screen, as shown, provides options and parameters to specify a URL, protocol or authentication information, to enable the system to automatically retrieve information for specified locations. When data is pulled, the system may define or determine when to access and pull data, and from which location to do so, and how often to pull the data.

In FIG. 21C, there is shown a screen shot of the window reached when the push selection of FIG. 20 is selected. As may be seen in FIG. 21C, there may be fillable fields to provide information to the system for pushing files, such as protocol, URL, and other access information. Entry of the information into these fields may enable the system to push information to this location.

In FIG. 21D, there is shown a distribution list screen which may be reached by selecting the appropriate selection in FIG. 20. In this window, a user may enter information as a internet distribution list in order to send messages to a group of people via the internet, for example. As discussed hereinthroughout, any list format may be accepted.

In FIG. 21E, there is shown a query definition list screen which may be reached by selecting the appropriate selection in FIG. 20. In this window, a user may enter information as a query definition list to be utilized by the system.

In FIG. 21F, there is shown a database log definition screen which may be reached by selecting the appropriate selection in FIG. 20. In this window, a user may enter information as a database log definition in order to give the system access to a resident database with appropriate contact information.

Figure 22:
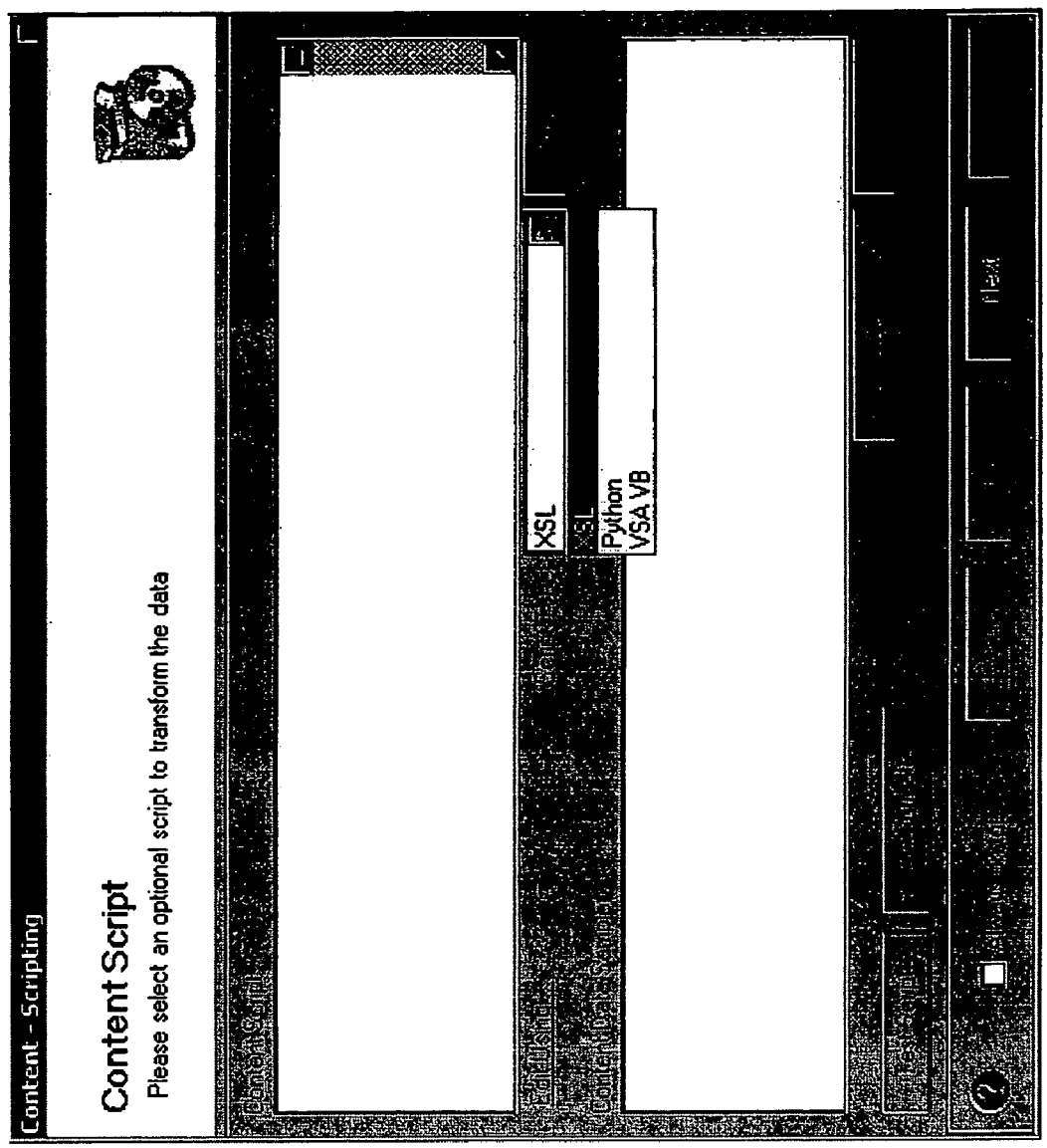
FIG. 22 illustrates a screen shot of a content script window which may be reached via the push or pull windows shown in FIGS. 21A and B via the window of FIG. 23 respectively.
Figure 23:
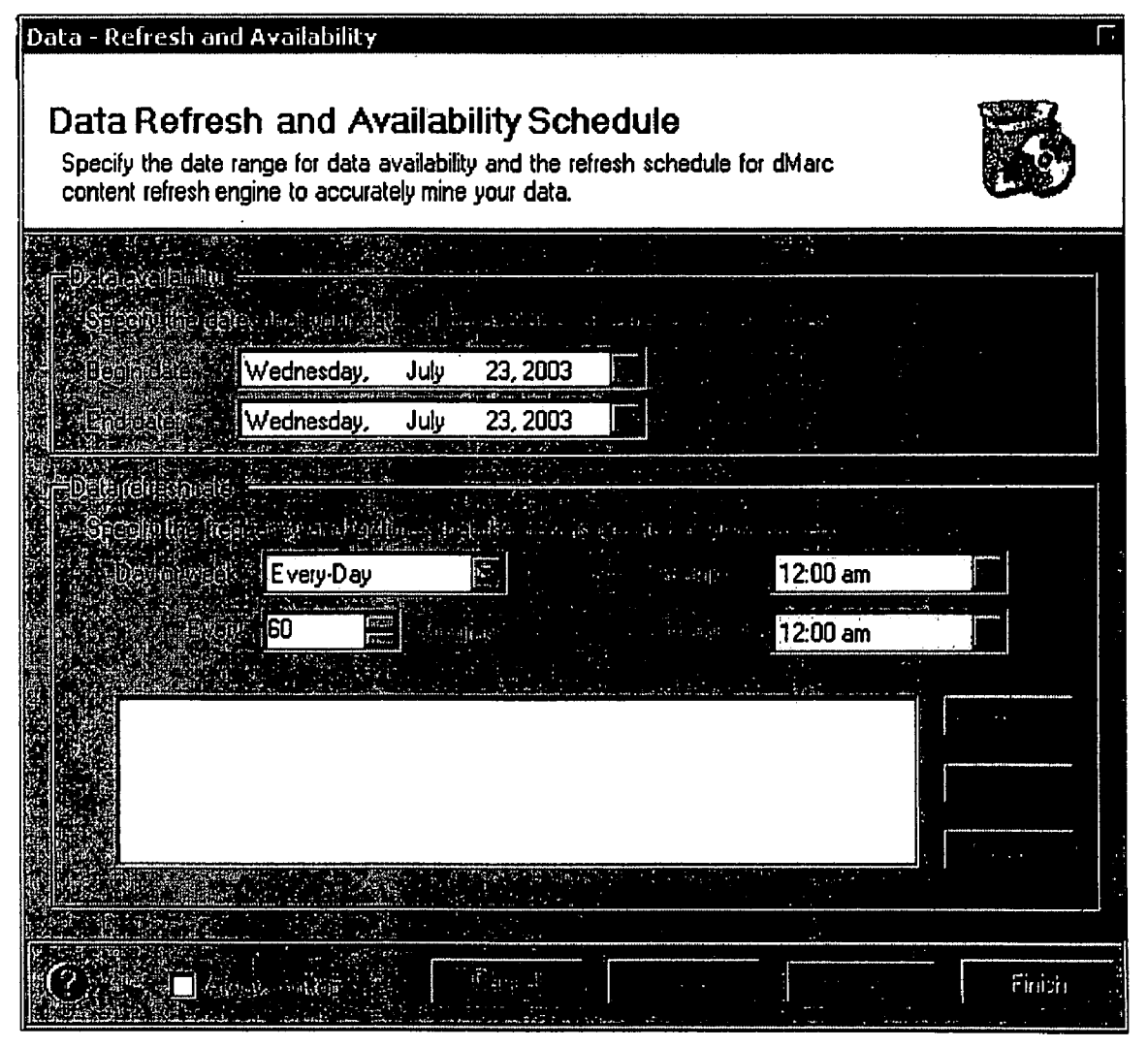

Referring now to FIG. 22, there is shown a screen shot of a content script window which may be reached via the push or pull windows shown in FIGS. 21A and B, via the window of FIG. 23, respectively. This window provides the user the opportunity to specify how the system data, i.e. campaign information, may be transformed prior to being delivered to the device. As may be seen in FIG. 22, XSL, Python, and VSA VB may be selected. As may be known in the art, XSL refers to Extensible Style Language, a specification for separating style from content when creating HTML or XML pages. The specifications may work as templates, allowing designers to apply single style documents to multiple pages. Other style specifications may include Cascading Style Sheets (CSS), which is similar to XSL but does not include two of XSL's features—namely allowing developers to dictate the way Web pages are printed, and specifications allowing the transference of XML documents across different applications. Python is an interpreted, object-oriented programming language. Python is similar to GNU, and is very portable since Python interpreters are available for most operating system platforms. VSA VB, also referred to as RAD, refers to the programming language and environment developed by Microsoft, which is based on the BASIC language. Visual Basic was one of the first products to provide a graphical programming environment and a paint metaphor for developing user interfaces. The Visual Basic programmer may add a substantial amount of code simply by dragging and dropping controls, such as buttons and dialog boxes, and then defining the appearance and behavior thereof. Although not a strict object-oriented programming language, Visual Basic nevertheless has an object-oriented philosophy. It is an event-driven language because each object may react to different events, such as a mouse click. Other programming languages may include C, C++, Pascal, and Java, for example.

Referring now to FIG. 23, there is shown a screen shot of a window reached from the window of FIG. 21B. As may be seen in FIG. 23, the user may enter refresh and availability dates, thereby providing the necessary information to the system for the system to properly mine the data.

Figure 24:
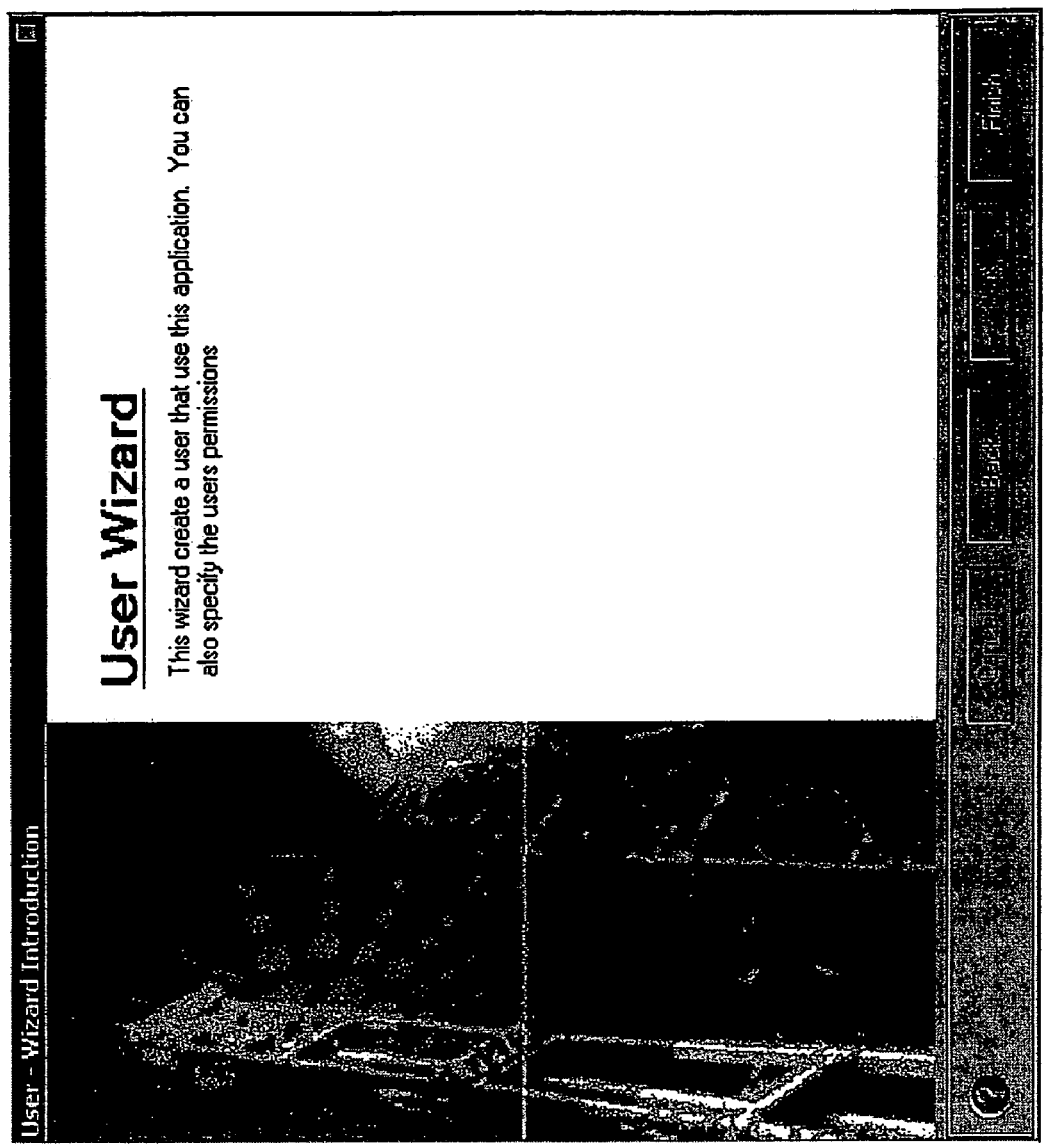
FIG. 24 illustrates a screen shot of the entry to user creation from the tab of FIG. 4.

Referring now to FIG. 24, there is shown a screen shot of an entry to user creation from the tab of FIG. 4. As shown in FIG. 24, this wizard may be utilized to create a user to use the application and specify the parameters of the user's use. The user's access in the hub may be limited only to those networks necessary, as discussed hereinabove. The user's access may be limited as defined. Users may also have different levels of permission.

Figure 25:
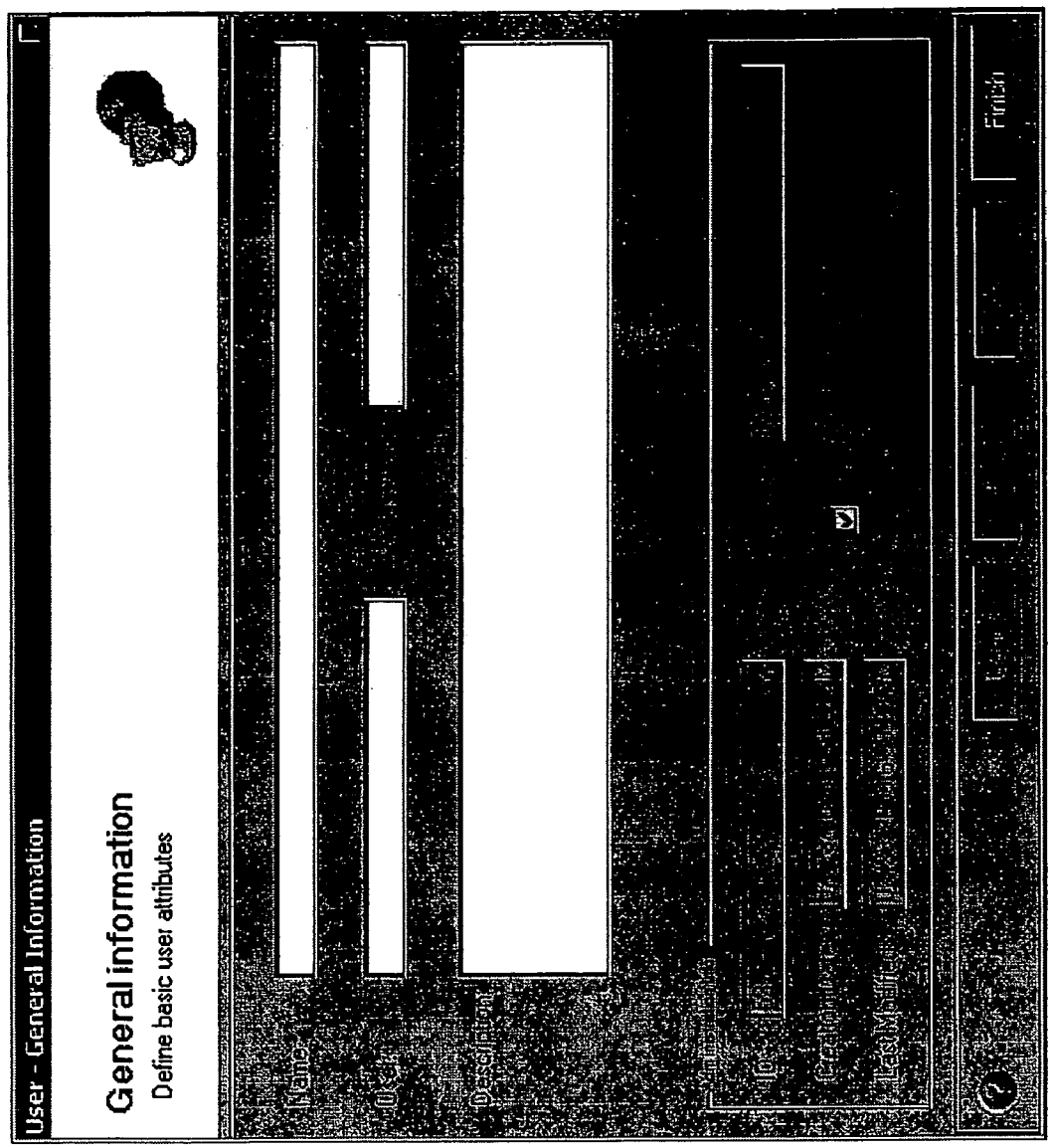
FIG. 25 illustrates a general information window with fillable fields for entering basic user information.

After clicking the next tab of the window depicted in FIG. 24, the window depicted in FIG. 25 may be reached. Referring to FIG. 25, there is shown a general information window with fillable fields for entering basic user information. As may be seen in FIG. 25, the name, user, password, and description may be entered.

Figure 26:
FIG. 26 illustrates a window of reached by clicking the next tab of FIG. 25.

Referring now to FIG. 26, there is shown a window reached by clicking the next tab of FIG. 25. In this window, the user may enter the permission information of a newly created user. Permissions unavailable may be seen in the excluded permission section, and may be selected and moved to included permissions as desired.

Figure 27:
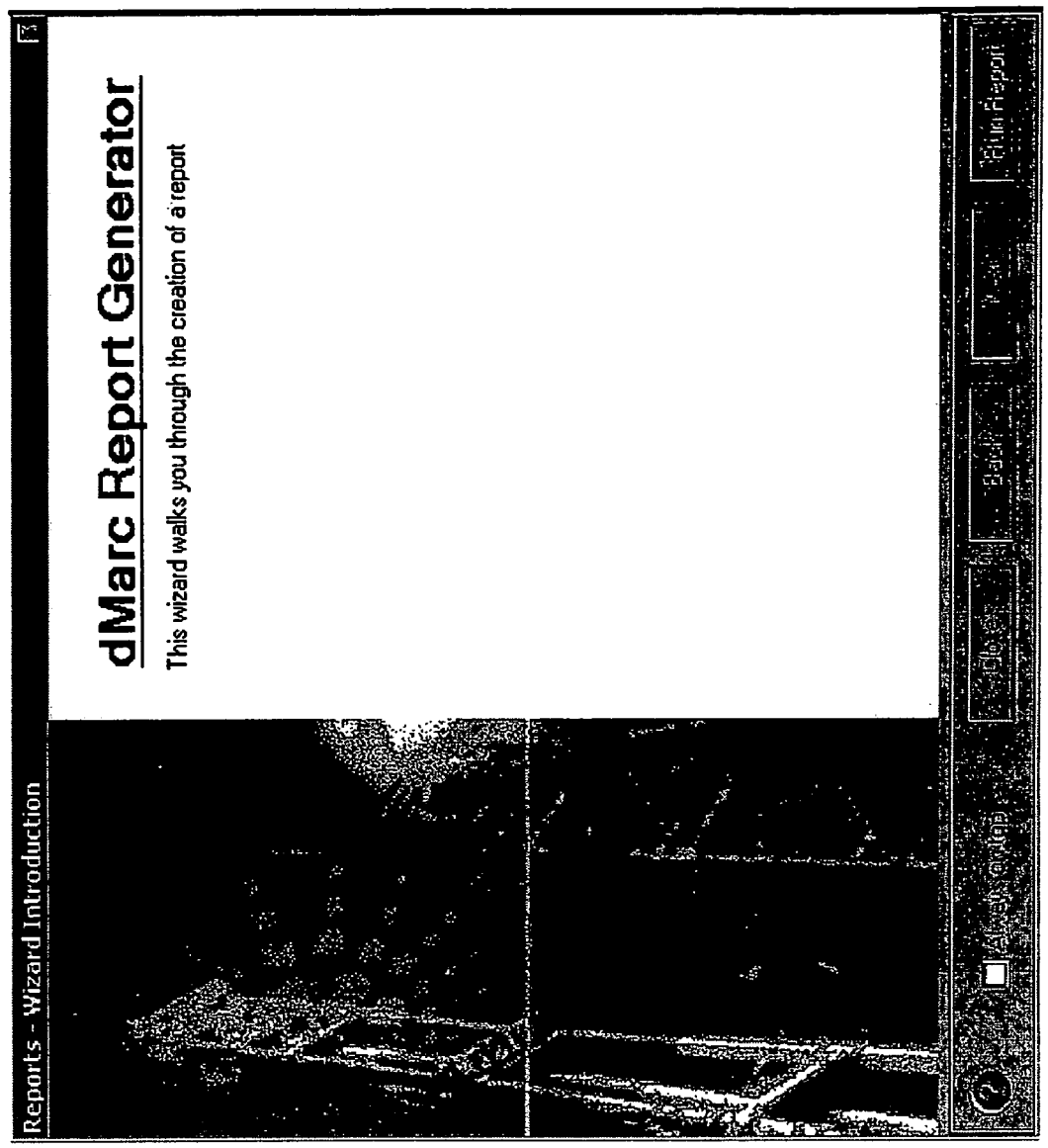
FIG. 27 illustrates a window for creating a report that may be reached by the tab of FIG. 4.

Referring now to FIG. 27, there is shown a window for creating a report that may be reached by the tab of FIG. 4. This window is the gateway to the report generator wizard. The hub and associated software may produce reports, as discussed hereinthroughout. Reports may be generated based on campaigns, or for multiple campaigns. These reports may be regarded as workflows and may have alerts and notifications. An alert may provide a correspondence associated with a report being complete, or with a report setting forth certain flagged information, for example. Further, these reports and alerts may be input back into the hub and campaign, such that the reports and alerts provide information on which to modify subsequent campaigns in order to determine or increase the effectiveness of the use of the present invention.

Figure 28:
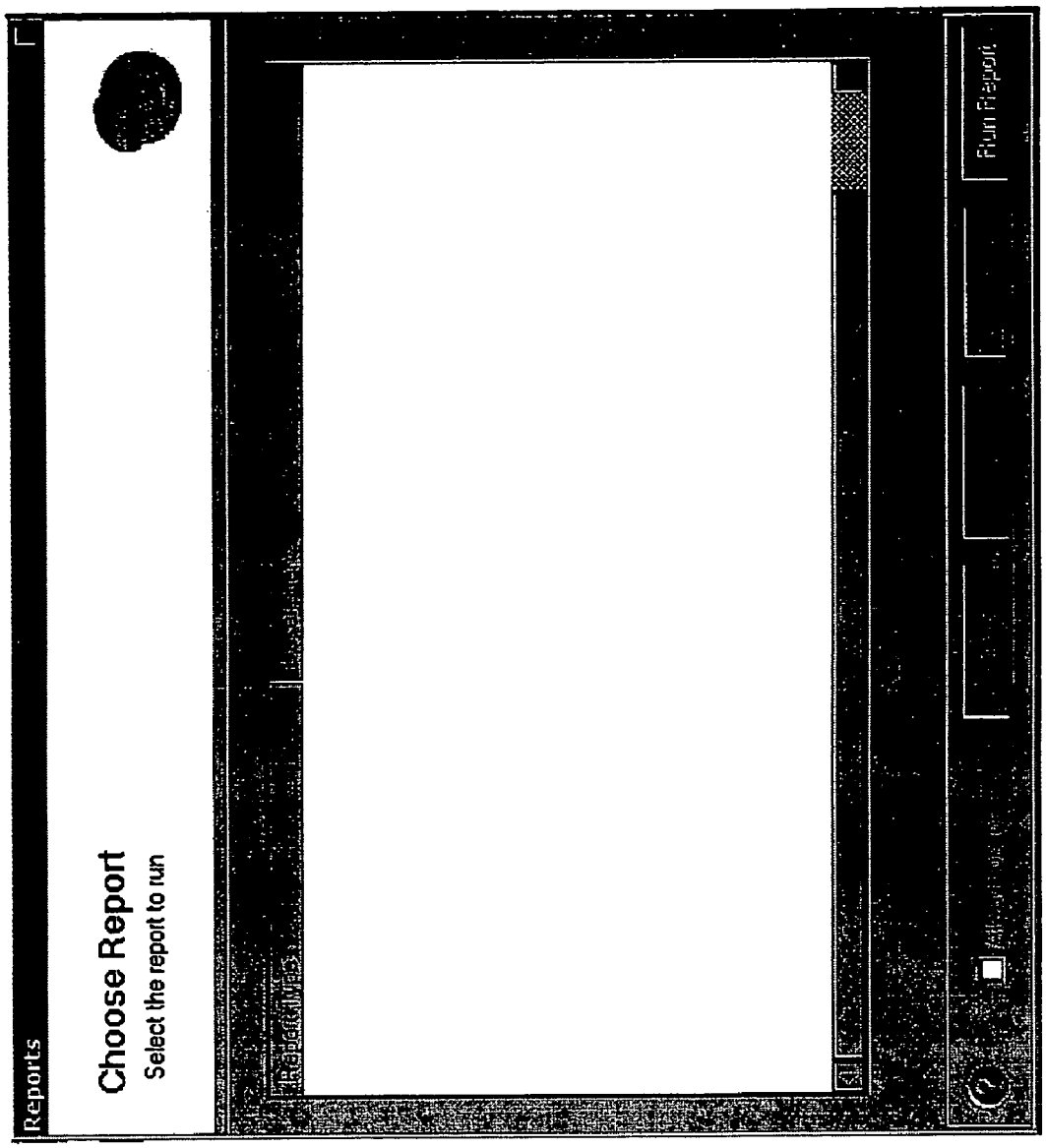
FIG. 28 illustrates a window for selecting a report within the report generator wizard entered through the window of FIG. 27; and, FIG. 29 illustrates a specific embodiment of the system described with respect to FIG. 1.

Referring now to FIG. 28, there is shown a window for selecting a report within the report generator wizard. This window provides the user with the option of selecting from the available reports to be generated. Once a report is selected, the system may run the necessary steps to generate the report. Reports may also be generated automatically, or in accordance with the terms of a campaign, for example. For example, as with all mechanisms within a campaign, a report may be triggered by a "trigger event", for which scripts running at the input or output of the hub are monitored.

Figure 29:
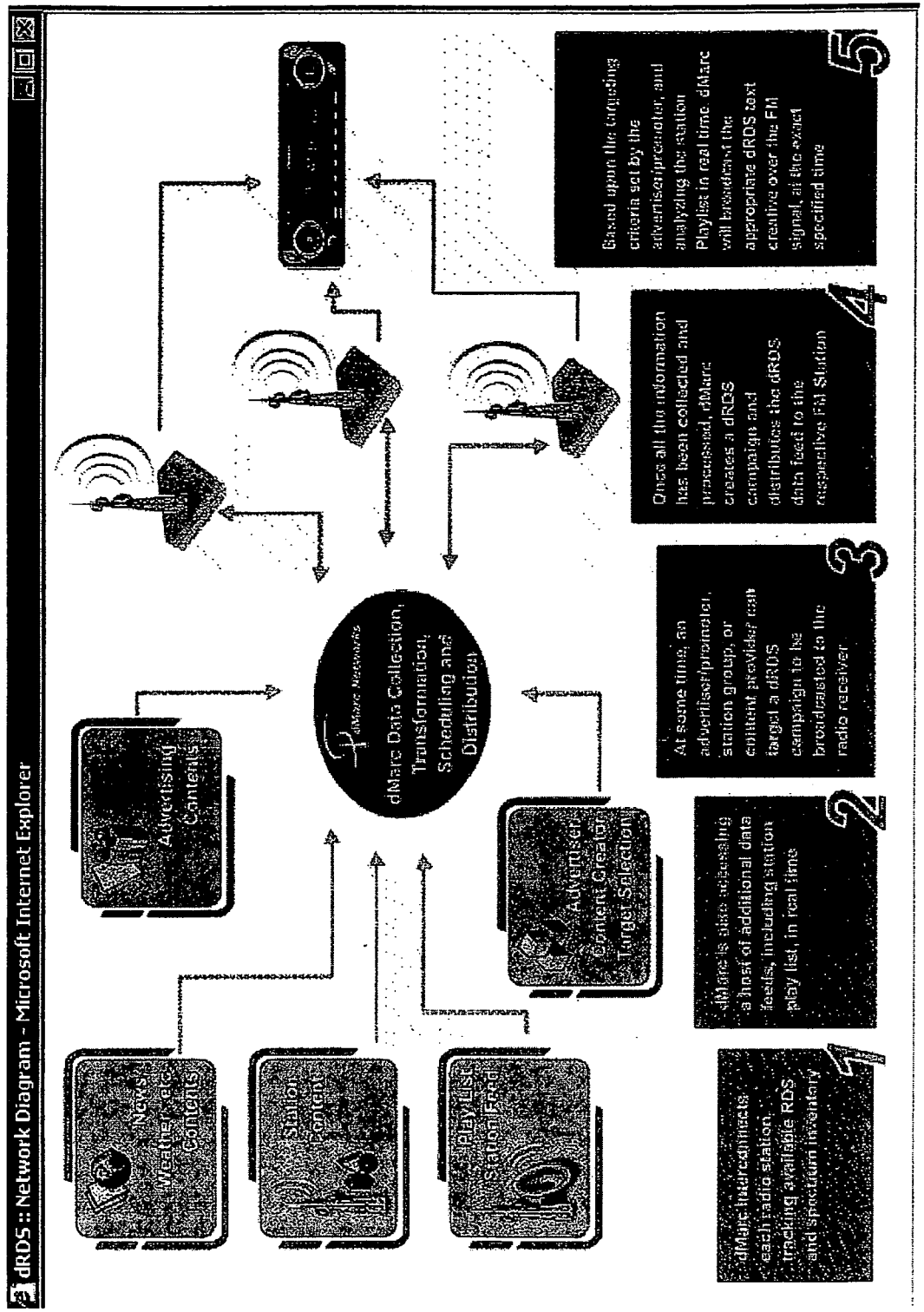

For example, a dynamic radio data system developed in accordance with the present invention may enable radio stations, such as analog FM radio stations, for example, to dynamically broadcast text to be displayed on specifically enabled RDS receivers, a standard feature prevalent in the new car industry, as discussed hereinabove. Recipients may receive and view dynamic and targeted text broadcasts on their respective radio displays, including such data as song and artist information, news, traffic, weather, station events, customized content, and advertisements, for example, thereby providing rich and compelling content for consumers and a high-margin revenue stream for radio groups. With reference now to FIG. 29, there is shown a specific embodiment of such a radio system. In particular, there may be and associated or sub-system of the present invention designed to deliver greetings to recipients in their respective cars via the radio display, such as via RDS. The present invention interconnects each radio station to each available RDS radio in a given market with spectrum inventory, such as news, weather, and advertising. Further, there are also a host of additional available data feeds, including station play lists, that may be added to the system in real time. Also, as described hereinabove, an advertiser or promoter, station or group, or content provider may target the RDS campaign and insert content to be transmitted to the radio receiver. After collecting all of the information and appropriately superimposing the necessary signals, a campaign may be created, including the distribution of the data feed to the proper FM station. Based on the content of the data information, the station selected, and the content of the station, the system may broadcast the content at the proper time to coincide with the FM signal.

In this embodiment of the present invention, a listener may, for example, select a station. A message relevant to that station may be entered to the hub. This message may take many forms, such as visual, voice, or text, for example. For the sake of simplicity, a text message may describe hereinbelow, but those skilled in the art may realize that other formats of messages may be used and delivered. In the text message format, the user may type in the message to be delivered, and make relevant purchase selections, such as selecting to buy a one time service or buying a package accommodation or a certain number of repetitions. After entering the message, the user may select a time and local to display the message, and may enter relevant recipient information, such as a name. As may be evident to one possessing an ordinary skill in the pertinent arts, the listener, selector, and recipient may be the same individual, or may be multiple individuals. The message may then be delivered as described hereinabove to the listener that had selected the station or stations over which the user has selected the message to be broadcast.

More particularly, with respect to personal greetings, advertising, or the like, the user may select a number of repetitions, a time for repetitions, or the like. A user may further place a weight upon the message or ad, such as by paying in accordance to the weight the user desires to be accorded to the message or ad. Alternatively, weights may be assigned, for example, on a first come, first served basis. Messages or ads having greater weight than other messages or ads may outweigh other messages targeting the same device, at the same time, and hence may receive priority delivery over those lesser-weighted messages or ads.

An additional exemplary embodiment of the present invention provides, for example, for the purchase or songs or albums as those songs are being played over, for example, a radio station, or as a video is playing via a television. As a recipient listens to the radio in the car, or some alternative place of listening or viewing, the recipient may particularly favor a particular song heard or viewed. If the recipient determines that the recipient would like to purchase the song or album in some form such as vinyl, compact disk, or mpeg, or determines that the song is from a movie and wishes to get the movie on DVD or VHS, for example, the recipient may dial in to the hub using a computer, cell phone or other data transmission device, enter the station name or call number, and attempt to buy the song that was just aired. The recipient may scroll through the last several songs if, for example, the call is not immediately placed following the airing of the desired song. The appropriate geographic location in which the desired song was aired may be determined by the hub by, for example, determining the location of emanation of the call. For example, it may be determined that the Los Angeles area is the recipient location, either based on the radio stations entered or based on the number that the call was made from. In order to prevent errors in determining location, a location mechanism may be used, such as GPS on the cell phone, for example. Alternatively, the recipient may enter information by keying it in for transmission, as is known to those possessing an ordinary skill in the pertinent arts. After the initial startup, the recipient may be identified as an experienced user, such as by a login assigned on the first use, and therefore shorten the ordering and/or payment process.

According to an aspect of the present invention, the system of the present invention may additionally be utilized with the OnStar system, or with the 911 emergency system as discussed hereinabove. For example, if used with OnStar, the user may need a tow truck for a disabled vehicle, and may accordingly contact the hub via an input, such as the OnStar. The hub may apply business logic to the user request, and may generate via the output calls, or other types of contact, to a series of tow trucks, such as five companies, for example, and query if any are able to tow from a specified location, namely the address of the disabled vehicle, within an allotted period of time, such as 20 minutes, for example. If the truck is able to accommodate the request, the truck or dispatcher may enter a "1" to enter a bid, such as to the input of the hub. In addition, OnStar may provide an input of more specific or additional information regarding the vehicle and a crash, such as extent of vehicle damage which may correlate to extent of driver injury and the need for emergency response personnel. The system may additionally accept as data the amount of damage to the vehicle based on the speed of the crash, the location of the crash, and the like. Further, the system may be able to pull, such as from the internet, comparatives of how bad people are likely hurt, how fast an ambulance may be needed, and which nearby hospitals offer the best type of care for the probable injuries, based on the input to the hub, and the logic decisions of the hub.

In an additional exemplary embodiment of the present invention, sweepstakes and giveaways may be provided for by the present invention. For example, a prize may be awarded to every caller or every Xth caller, such as every $100^{th}$ caller, $1000^{th}$ caller, etc., by a radio station. The radio station would thus enter, via the inputs, information on each call received by the radio station, such as by providing, as an input to the hub, tracking information of that radio station's web site, or by providing access to the radio station telephone system as an input to the hub. The hub may then apply the input business logic, such as tracking the number of calls until the flagged number is reached, and, upon reaching that flagged number, the hub may output to the station the notification that the current, or the next, caller is a winner, and a notification of what prize has been won. Alternatively, as may be apparent to those skilled in the art, every third time the weather is announced by the station, it may be brought to the listener by a sponsor. Such sponsorship may be similarly tracked to the giveaway embodiment discussed immediately hereinabove.

Those of ordinary skill in the art may recognize that many modifications and variations of the present invention may be implemented without departing from the spirit or scope of the invention. Thus, it is intended that the present invention covers the modifications and variations of this invention provided they come within the scope of the appended claims and their equivalents.

What is claimed is:

1. A system for broadcasting advertisements to a plurality of users, the system comprising:

a data store adapted to store information about a plurality of time slots for broadcasting advertisements by one or more radio stations;

a user interface module adapted to receive an advertisement for broadcasting and one or more user-selected criteria according to which to broadcast the advertisement; and a server system adapted to automatically select one or more of the plurality of time slots for broadcasting the advertisement according to the one or more user-selected criteria and to electronically transmit the advertisement to the one or more radio stations for the selected time slot in real time.

2. The system of claim 1, wherein the one or more user-selected criteria comprises at least one of a number of listeners of a radio station, a strength of a signal of a radio station, demographics of listeners of a radio station, time of a day for playing an advertisement, and a type of a radio station.

3. The system of claim 1, wherein the server system is adapted to transmit the advertisement to a digital automated system at the radio station.

4. The system of claim 1, wherein the advertisement is an audio file.

5. The system of claim 1, wherein the advertisement is a text file.

6. The system of claim 1, wherein the radio station is an AM radio station.

7. The system of claim 1, wherein the radio station is an FM radio station.

8. The system of claim 1, wherein the radio station is a digital radio station.

9. The system of claim 1, wherein the radio station is a satellite radio station.

10. The system of claim 1, wherein the user interface module is further adapted to receive a selection of devices for broadcasting the advertisement.

11. The system of claim 10, wherein the device is a radio data system (RDS) receiver.

12. The system of claim 10, wherein the device is an AM receiver.

13. The system of claim 10, wherein the device is an FM receiver.

14. The system of claim 1, wherein the user interface module is further adapted to receive, from the one or more radio stations, a minimum acceptable price for broadcasting an advertisement.

15. The system of claim 1, wherein the server system is further adapted to determine an advertisement price according to at least one of popularity of the radio station, date of broadcasting, and time of broadcasting.

16. A method for broadcasting advertisements to a plurality of users, the method comprising:

storing information about a plurality of time slots for broadcasting advertisements by one or more radio stations;

receiving an advertisement for broadcasting and one or more user-selected criteria according to which to broadcast the advertisement;

automatically selecting one or more of the plurality of time slots for broadcasting the advertisement according to the one or more user-selected criteria; and electronically transmitting the advertisement to the one or more radio stations for the selected time slot in real time.

17. The method of claim 16, wherein the one or more user-selected criteria comprises at least one of a number of listeners of a radio station, a strength of a signal of a radio station, demographics of listeners of a radio station, time of a day for playing an advertisement, and a type of a radio station.

18. The method of claim 16, wherein the advertisement is an audio file.

19. The method of claim 16, further comprising receiving a selection of radio receiving devices for broadcasting the advertisement.

20. The method of claim 16, further comprising receiving, from the one or more radio stations, a minimum acceptable price for broadcasting an advertisement.

21. The method of claim 16, further comprising determining an advertisement price according to at least one of popularity of the radio station, date of broadcasting, and time of broadcasting.

22. A computer program product comprising:

a computer-readable storage medium having computer program code embodied therein for broadcasting advertisements to a plurality of users, the computer program code adapted to:

store information about a plurality of time slots for broadcasting advertisements by one or more radio stations;

receive an advertisement for broadcasting and one or more user-selected criteria according to which to broadcast the advertisement;

automatically select one or more of the plurality of time slots for broadcasting the advertisement according to the one or more user-selected criteria; and electronically transmit the advertisement to the one or more radio stations for the selected time slot in real time.

23. The computer program product of claim 22, wherein the one or more user-selected criteria comprises at least one of a number of listeners of a radio station, a strength of a signal of a radio station, demographics of listeners of a radio station, time of a day for playing an advertisement, and a type of a radio station.

24. The computer program product of claim 22, wherein the advertisement is an audio file.

25. The computer program product of claim 22, wherein the computer program code is further adapted to receive a selection of radio receiving devices for broadcasting the advertisement.

26. The computer program product of claim 22, wherein the computer program code is further adapted to receive, from the one or more radio stations, a minimum acceptable price for broadcasting an advertisement.

27. The computer program product of claim 22, wherein the computer program code is further adapted to determine an advertisement price according to at least one of popularity of the radio station, date of broadcasting, and time of broadcasting.

28. A system for broadcasting advertisements to a plurality of users, the system comprising:

a data store adapted to store information about a plurality of time slots for broadcasting advertisements by one or more radio stations;

a user interface module adapted to receive an advertisement for broadcasting and one or more user-selected criteria according to which to broadcast the advertisement; and a server system adapted to transmit advertisements to one or more radio stations, and to automatically select in real time one or more of the plurality of time slots for broadcasting the advertisement according to the one or more user-selected criteria, and to electronically transmit to a radio station an indication of the selected time slot for broadcasting the advertisement.

29. The system of claim 28, wherein the one or more user-selected criteria comprises at least one of a number of listeners of a radio station, a strength of a signal of a radio station, demographics of listeners of a radio station, time of a day for playing an advertisement, and a type of a radio station.

30. The system of claim 28, wherein the advertisement is an audio file.

31. The system of claim 28, wherein the user interface module is further adapted to receive a selection of radio receiving devices for broadcasting the advertisement.

32. The system of claim 28, wherein the user interface module is further adapted to receive, from the one or more radio stations, a minimum acceptable price for broadcasting an advertisement.

33. The system of claim 28, wherein the server system is further adapted to determine an advertisement price according to at least one of popularity of the radio station, date of broadcasting, and time of broadcasting.

34. A method for broadcasting advertisements to a plurality of users, the method comprising:
storing information about a plurality of time slots for broadcasting advertisements by one or more radio stations;
electronically transmitting to one or more of the radio stations advertisements for broadcasting;
receiving an advertisement for broadcasting and one or more user-selected criteria according to which to broadcast the advertisement;
automatically selecting in real time one or more of the plurality of time slots for broadcasting the advertisement according to the one or more user-selected criteria; and
electronically transmitting, to a radio station, an indication of the selected time slot for broadcasting the advertisement.

35. The method of claim 34, wherein the one or more user-selected criteria comprises at least one of a number of listeners of a radio station, a strength of a signal of a radio station, demographics of listeners of a radio station, time of a day for playing an advertisement, and a type of a radio station.

36. The method of claim 34, wherein the advertisement is an audio file.

37. The method of claim 34, further comprising receiving a selection of radio receiving devices for broadcasting the advertisement.

38. The method of claim 34, further comprising receiving, from the one or more radio stations, a minimum acceptable price for broadcasting an advertisement.

39. The method of claim 34, further comprising determining an advertisement price according to at least one of popularity of the radio station, date of broadcasting, and time of broadcasting.

40. A computer program product comprising:
a computer-readable storage medium having computer program code embodied therein for broadcasting advertisements to a plurality of users, the computer program code adapted to:
store information about a plurality of time slots for broadcasting advertisements by one or more radio stations;
electronically transmit to one or more radio stations advertisements for broadcasting;
receive an advertisement for broadcasting and one or more user-selected criteria according to which to broadcast the advertisement;
automatically select in real time one or more of the plurality of time slots for broadcasting the advertisement according to the one or more user-selected criteria; and
electronically transmit, to a radio station, an indication of the selected time slot for broadcasting the advertisement.

41. The computer program product of claim 40, wherein the one or more user-selected criteria comprises at least one of a number of listeners of a radio station, a strength of a signal of a radio station, demographics of listeners of a radio station, time of a day for playing an advertisement, and a type of a radio station.

42. The computer program product of claim 40, wherein the advertisement is an audio file.

43. The computer program product of claim 40, wherein the computer program code is further to receive a selection of radio receiving devices for broadcasting the advertisement.

44. The computer program product of claim 40, wherein the computer program code is further adapted to receive, from the one or more radio stations, a minimum acceptable price for broadcasting an advertisement.

45. The computer program product of claim 40, wherein the computer program code is further adapted to determine an advertisement price according to at least one of popularity of the radio station, date of broadcasting, and time of broadcasting.

* * * * *